| (12) | United States Patent | (10) Patent No.: | US 9,199,685 B2 |
|---|---|---|---|
| | Shimizu et al. | (45) Date of Patent: | Dec. 1, 2015 |

(54) INVERTED PENDULUM TYPE VEHICLE

(71) Applicant: HONDA MOTOR CO., LTD., Minato-Ku, Tokyo (JP)

(72) Inventors: Masahiro Shimizu, Saitama (JP); Yoshinobu Shiomi, Saitama (JP); Yoshinari Takemura, Saitama (JP); Wataru Yada, Saitama (JP); Yusuke Muto, Saitama (JP); Yuhi Nakagawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 373 days.

(21) Appl. No.: 13/873,286

(22) Filed: Apr. 30, 2013

(65) Prior Publication Data

US 2013/0299260 A1 Nov. 14, 2013

(30) Foreign Application Priority Data

May 14, 2012 (JP) .................................. 2012-111054
May 14, 2012 (JP) .................................. 2012-111059

(51) Int. Cl.
 *B62K 1/00* (2006.01)
 *B62K 3/00* (2006.01)
 (Continued)

(52) U.S. Cl.
 CPC ......... *B62K 3/007* (2013.01); *B62H 1/12* (2013.01); *B62K 1/00* (2013.01); *B60B 19/003* (2013.01); *B60B 19/12* (2013.01)

(58) Field of Classification Search
 CPC ............. B62H 1/02; B62K 1/00; B62K 3/007
 See application file for complete search history.

(56) References Cited

U.S. PATENT DOCUMENTS 8,162,092 B2 * 4/2012 Takenaka et al. ............. 180/222
8,386,159 B2 * 2/2013 Takenaka et al. ............. 701/124
(Continued)

FOREIGN PATENT DOCUMENTS

| GB | 2 242 173 A | 9/1991 |
|---|---|---|
| JP | H03-43138 U | 4/1991 |

(Continued)

OTHER PUBLICATIONS

Office Action issued Sep. 1, 2015 in the corresponding Japanese Patent Application 2012-111054.
(Continued)

*Primary Examiner* — Joseph Rocca
*Assistant Examiner* — Marc A Scharich
(74) *Attorney, Agent, or Firm* — Carrier Blackman & Associates, P.C.; William D. Blackman; Joseph P. Carrier

(57) ABSTRACT

An inverted pendulum type vehicle includes a vehicle body frame; a main wheel including a plurality of rotatable driven rollers arranged to form a ring, and a pair of left and right driving disks supported for rotation on the vehicle body frame. Each of the driving disks includes a plurality of rotatable driving rollers, disposed for contact in a twisted relationship with the driven rollers. The vehicle also includes a pair of left and right driven pulleys provided on outer sides of the driving disks, and a pair of left and right driving units, attached to the vehicle body frame above the main wheel, and including motors having output power shafts to which driving pulleys are attached. Endless transmission members interconnect the driving pulleys and the driven pulleys. The left and right driving units are disposed in an vertically offset relationship from each other.

19 Claims, 19 Drawing Sheets

(51) Int. Cl.
*B62H 1/12* (2006.01)
*B60B 19/00* (2006.01)
*B60B 19/12* (2006.01)

(56) References Cited

U.S. PATENT DOCUMENTS

| | | | |
|---|---|---|---|
| 8,776,934 B2* | 7/2014 | Muto et al. | 180/220 |
| 2011/0070998 A1* | 3/2011 | Takenaka et al. | 476/68 |
| 2012/0032496 A1 | 2/2012 | Takenaka et al. | |
| 2012/0078482 A1* | 3/2012 | Takenaka et al. | 701/70 |
| 2012/0172169 A1* | 7/2012 | Gomi et al. | 475/197 |

FOREIGN PATENT DOCUMENTS

| | | | |
|---|---|---|---|
| JP | 2002-199177 A | 7/2002 |
| JP | 2005-145296 A | 6/2005 |
| JP | 2010-247640 A | 11/2010 |
| JP | 2011-063242 A | 3/2011 |

OTHER PUBLICATIONS

Office Action issued Sep. 2, 2015 in the corresponding Japanese Patent Application 2012-111059.

* cited by examiner

FRONT ← → REAR

INVERTED PENDULUM TYPE VEHICLE

CROSS-REFERENCE TO RELATED APPLICATIONS

The present invention claims priority under 35 USC 119 based on Japanese patent applications Nos. 2012-111054, filed on May 14, 2012, and 2012-111059, filed on May 14, 2012. The entire subject matter of each of these priority documents, including specification claims and drawings thereof, is incorporated by reference herein.

BACKGROUND OF THE INVENTION

1. Field of the Invention

The present invention relates to an inverted pendulum type vehicle, and more particularly to an inverted pendulum type vehicle wherein left and right driving disks disposed at the opposite left and right ends of a main wheel are driven to rotate by corresponding individual driving units.

2. Description of the Background Art

Conventionally, as an inverted pendulum type vehicle, for example, an inverted pendulum type vehicle is known which includes a vehicle body frame, a main wheel, a pair of left and right driving disks, and driving units (see, for example, Patent Documents 1 and 2). The main wheel is configured by combining a plurality of rotatable driven rollers in such a manner that axial lines of rotation of the driven rollers form a ring. The left and right driving disks are supported for rotation on the vehicle body frame and positioned on the opposite sides of the main wheel in a substantially coaxial relationship with an axial line of rotation of the main wheel. Each of the left and right driving disks includes a plurality of rotatable driving rollers disposed for contact in a twisted relationship with the driven rollers. The driving units respectively drive the left and right driving disks independently of each other.

The driving units include a left side driving unit for driving the left side driving disk, and a separate right side driving unit for driving the right side driving disk. Each of the left and right side driving units includes a driving motor attached to the vehicle body frame at a position above the main wheel, and a driving pulley attached to an output power shaft of the electric motor. Each of the left and right side driving units further includes a driven pulley attached to a corresponding one of the left and right driving disks, and an endless transmission belt extending between and around the mutually corresponding driving pulley and driven pulley.

[Patent Document 1]—Japanese Patent Laid-Open No. 2010-247640

[Patent document 2]—Japanese Patent Laid-Open No. 2011-63242

PROBLEM TO BE SOLVED BY THE INVENTION

It is demanded to increase the driving torque of the driving disks in order to improve the traveling performance of the inverted pendulum type vehicle. As a countermeasure for increasing the driving torque, it seems recommendable to use an electric motor of an increased size to use increased output torque of the driving motor or to raise the reduction ratio between the electric motor and the driving disks.

However, in a conventional inverted pendulum type vehicle, the electric motor of the left side driving unit and the electric motor of the right side driving unit are disposed in a juxtaposed relationship with each other in a vehicle body widthwise direction at the same height on the vehicle. Therefore, increase of the size of the electric motor is restricted by a space, and in order to use an electric motor of an increased size, it is necessary to increase the vehicle body width. Further, in a power transmission mechanism configured from a driving pulley, a driven pulley and an endless transmission belt, the reduction ratio depends upon the pulley size ratio between the driving pulley and the driven pulley, and there is a limitation to increase of the reduction ratio.

In contrast, it seems recommendable to add a new gear type reduction gear to the electric motor. However, it is difficult in terms of the space to add a new reduction gear to the electric motor, and it is necessary to increase the size of the vehicle body.

Further, if it is attempted to prepare a plurality of types of inverted pendulum type vehicles having output torque different depending upon the physique of the occupant such as a model on which a small person is to ride or another model on which a large person is to ride, then the conventional inverted pendulum type vehicle is not suitable. In particular, in the conventional inverted pendulum type vehicle, the electric motor of the left side driving unit and the electric motor of the right side driving unit are disposed in a juxtaposed and aligned relationship with each other in the vehicle body widthwise direction at the same height on the vehicle, as described above. Therefore, a space necessary for the change to an electric motor of different output torque, particularly, a space in the vehicle body widthwise direction, cannot be assured. Consequently, a plurality of inverted pendulum type vehicles of different vehicle classifications must be prepared, wherein the vehicle body frame is changed in response to the output torque of the electric motor.

SUMMARY OF THE INVENTION

An object of the present invention is to make it possible to increase the output torque of driving disks while retaining a compact vehicle body configuration, without changing the vehicle classification.

Another object of the present invention is to apply appropriate initial tension to an endless transmission belt used in a driving unit of an inverted pendulum type vehicle.

Throughout the present specification, reference numbers are used to refer to the exemplary structures shown in the drawings, and such numbers are intended to illustrate, rather than to limit the invention.

According to a first aspect of the present invention, there is provided an inverted pendulum type vehicle including: a vehicle body frame (10); a main wheel (52) formed by combining a plurality of rotatable driven rollers (64) such that axial lines of rotation of the driven rollers (64) form a ring; left and right driving disks (58) supported for rotation on the vehicle body frame (10) in such a manner as to be positioned on the left and right sides of the vehicle body frame (10) in a substantially coaxial relationship with an axial line of rotation of the main wheel (52) and each including a plurality of rotatable driving rollers (66) disposed for contact in a twisted relationship with the driven rollers (64).

The vehicle also includes left and right driven pulleys (60) provided coaxially on the vehicle body outer sides of the driving disks (58); driving units (90, 130) attached to the vehicle body frame (10) above the main wheel (52) and having output power shafts (98, 138) to which driving pulleys (100, 140) are attached; and endless transmission members (122, 144) extending between and around mutually corresponding ones of the driving pulleys and the driven pulleys (60), wherein the left and right driving units (90, 130) are disposed in an vertically offset relationship from each other.

According to a second aspect of the present invention, there is provided an inverted pendulum type vehicle wherein the left and right driving units (90, 130) overlap at least at part thereof with each other as viewed in plan.

According to a third aspect of the present invention, there is provided an inverted pendulum type vehicle wherein each of the driving units (90, 130) has an electric motor (84, 132), a reduction gear (96, 136) disposed between the corresponding one of the output power shafts (98, 138) and the electric motor (84, 132).

According to a fourth aspect of the present invention, there is provided an inverted pendulum type vehicle wherein the electric motor (84, 132) of each of the driving units (90, 130) is disposed at a position displaced to the side on which the corresponding one of the reduction gears (96, 136) is not disposed with respect to a center line in the vehicle widthwise direction, and the electric motor (84) of the driving unit (90) disposed on the upper stage is positioned just above the reduction gear (136) of the driving unit (130) disposed on the lower stage, while the reduction gear (96) of the driving unit (90) disposed on the upper stage is positioned just above the electric motor (132) of the driving unit (130) disposed on the lower stage.

According to a fifth aspect of the present invention, there is provided an inverted pendulum type vehicle wherein each of the reduction gears (96, 136) has a portion projecting sidewardly with respect to the center axial line of the corresponding one of the electric motors (84, 132), and the projecting portions (102A, 142A) of the reduction gears (96, 136) are disposed so as to project in different directions from each other between the left and right driving units (90, 130).

According to a sixth aspect of the present invention, there is provided an inverted pendulum type vehicle wherein the vehicle body frame (10) has a pair of left and right attachment plates (22, 24) disposed in parallel to each other on the opposite sides of the vehicle body, and the driving units (90, 130) are fixed at portions thereof which neighbor with the output power shafts (98, 138) while openings or cutaway portions (22B, 24B) through which the output power shafts (98, 138) extend are formed in the attachment plates (22, 24), respectively.

According to a seventh aspect of the present invention, there is provided an inverted pendulum type vehicle which has: a vehicle body frame (10); a main wheel (52) formed by combining a plurality of rotatable driven rollers (64) such that axial lines of rotation of the driven rollers (64) form a ring; left and right driving disks (58) supported for rotation on the vehicle body frame (10) in such a manner as to be positioned on the opposite left and right sides of the vehicle body frame (10) in a substantially coaxial relationship with an axial line of rotation of the main wheel (52) and each including a plurality of rotatable driving rollers (66) disposed for contact in a twisted relationship with the driven rollers (64); left and right driven pulleys (60) provided coaxially on the vehicle body outer sides of the driving disks (58); driving units (90, 130) attached to the vehicle body frame (10) above the main wheel (52) and having output power shafts (98, 138) to which driving pulleys (100, 140) are attached; and endless transmission members (122, 144) extending between and around mutually corresponding ones of the driving pulleys (100, 140) and the driven pulleys (60), wherein the inverted pendulum type vehicle has adjustment means for attaching the left and right driving units (90, 130) to the vehicle body frame (10) such that fixing positions of the left and right driving units (90, 130) in the upward and downward direction can be changed.

According to an eighth aspect of the present invention, there is provided an inverted pendulum type vehicle wherein the inverted pendulum type vehicle has adjustment bolts (124, 146) attached for rotation to the vehicle body frame (10) and screwed with an upper portion of the driving units (90, 130), and the driving units (90, 130) are moved in the upward and downward directions with respect to the vehicle body frame by adjustment of the screwed amount of the adjustment bolts (124, 146).

According to a ninth aspect of the present invention, there is provided an inverted pendulum type vehicle wherein attachment plates (22, 24) are attached to the vehicle body frame (10) sidewardly of the vehicle body and bolt penetrating holes (22A, 24A) each in the form of an elongated hole elongated in the upward and downward direction are formed in the attachment plates (22, 24), and the driving units (90, 130) are fixed to the vehicle body frame (10) by mounting bolts (26, 28) which extend through the bolt penetrating holes (22A, 24A) and held in threaded engagement with the driving units (90, 130).

According to a tenth aspect of the present invention, there is provided an inverted pendulum type vehicle wherein openings or cutaway portions (22B, 24B) through which the output power shafts (98, 138) extend are formed in the attachment plates (22, 24), respectively.

According to an eleventh aspect of the present invention, there is provided an inverted pendulum type vehicle wherein the attachment plate (22, 24) of the left side driving unit (90) and the attachment plate (22, 24) of the right side driving unit (130) are attached to the sides of the vehicle body opposite to each other.

According to a twelfth aspect of the present invention, there is provided an inverted pendulum type vehicle wherein the left and right driving units (90, 130) are disposed in an offset relationship from each other on two upper and lower stages and an upper frame (14D, 14E) of the vehicle body frame (10), to which the driving unit (130) on the lower stage is attached, is positioned below the driving unit (90) on the upper stage, and a space (149) into which a tool (T) or a jig for rotating the adjustment bolt (146) can be advanced is assured between the upper frame (14D) and a bottom portion of the driving unit (90) on the upper stage even if the driving unit (90) on the upper stage is positioned at a most downwardly moved position.

According to a thirteenth aspect of the present invention, there is provided an inverted pendulum type vehicle wherein each of the left and right driving units (90, 130) is configured from an electric motor (84, 132) and a reduction gear (96, 136), and the reduction gears (96, 136) are fixed to the attachment plates (22, 24) while the electric motors (84, 132) are positioned on the open side.

According to the first aspect of the present invention, in comparison with a case in which the left and right driving units (90, 130) are disposed in a juxtaposed relationship in the vehicle widthwise direction at the same height on the vehicle, a greater disposition space in the vehicle widthwise direction can be taken for each of the driving units (90, 130) in the same vehicle body width. Consequently, increasing the torque of the driving units, and addition of the reduction gears become possible without increasing the vehicle body width. Further, the driving units (90, 130) having output power torque ready for a model of different driving torque can be disposed suitably without changing the vehicle classification.

According to the second aspect of the present invention, in comparison with the case in which the left and right driving units (90, 130) are disposed in a juxtaposed relationship in the vehicle widthwise direction at the same height on the vehicle, upsizing (increase in torque) of the individual driving units (90, 130) can be carried out with the same vehicle body width.

According to the third aspect of the present invention, since an opening is provided at the disposition portions of the driving units (90, 130), the new reduction gears (96, 136) are added, and the driving torque of the driving disks (58) increases by speed reduction by the new reduction gears.

According to the fourth aspect of the present invention, the weight balance between the left and the right of the vehicle body frame is improved, and since the electric motors (84, 132) which are heat sources are disposed in a spaced relationship from each other, heat damage by adjacent disposition of the heat source portions to each other can be avoided.

According to the fifth aspect of the present invention, effective use of space and balancing of weight between the front and the rear of the vehicle body can be carried out.

According to the sixth aspect of the present invention, the power transmission sections including the driving pulleys (100, 140) are supported more firmly by the attachment plates (22, 24), and the rigidity of the vehicle body frame (10) is enhanced by the attachment plates (22, 24) and the supporting rigidity of the power transmission sections is raised.

According to the seventh aspect of the present invention, if the fixing positions of the driving units (90, 130) themselves in the upward and downward direction to the vehicle body frame (10) are changed, then the spacing distance between the driving pulleys (100, 140) and the driven pulleys (60) changes. Consequently, initial tension is applied to the endless transmission members (122, 144) without the necessity for provision of tension application means such as a tension roller.

According to the eighth aspect of the present invention, the initial tension to be applied to the endless transmission members (122, 146) can be adjusted quantitatively by adjustment of the screwed amount of the adjustment bolts (124, 146).

According to the ninth aspect of the present invention, the driving units (90, 130) can be attached to the vehicle body frame (10) by a simple attachment structure such that the fixing positions thereof in the upward and downward direction can be changed.

According to the tenth aspect of the present invention, the side of the endless transmission members (122, 144) to which the initial tension is applied including the driving pulleys (100, 140) is supported more firmly by the attachment plates (22, 24). Further, the rigidity of the vehicle body frame (10) is improved by the attachment plates (22, 24) and the supporting rigidity of the power transmission sections is enhanced.

According to the eleventh aspect of the present invention, the left and right driving units (90, 130) can be supported individually with high rigidity by the disposition of the attachment plates (22, 24).

According to the twelfth aspect of the present invention, even if the left and right driving units (90, 130) are disposed on the two upper and lower stages relative to each other, adjustment of the position of the driving unit (130) on the lower stage in the upward and downward direction can be carried out. An upper frame of the vehicle body frame (10) to which the driving unit (130) on the lower stage is attached serves as a lower frame of the vehicle body frame (10) to which the driving unit (90) on the upper stage is attached. The driving units (90, 130) can be accessed through the space, in which the driving unit (90) on the upper stage is accommodated, from the side on which the attachment plate (22) is not provided. In short, since the driving side of the driving unit (130) on the lower stage becomes the open side of the upper space, the adjustment bolts (124, 146) of the driving units (90, 130) on the upper stage and the lower stage can be accessed from the same side without being obstructed by the endless transmission member (122).

According to the thirteenth aspect of the present invention, since the electric motors (84, 132) are positioned on the open side, a harness and so forth can be wired readily and besides the electric motors (84, 132) can be connected simply.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION

Figure 1:
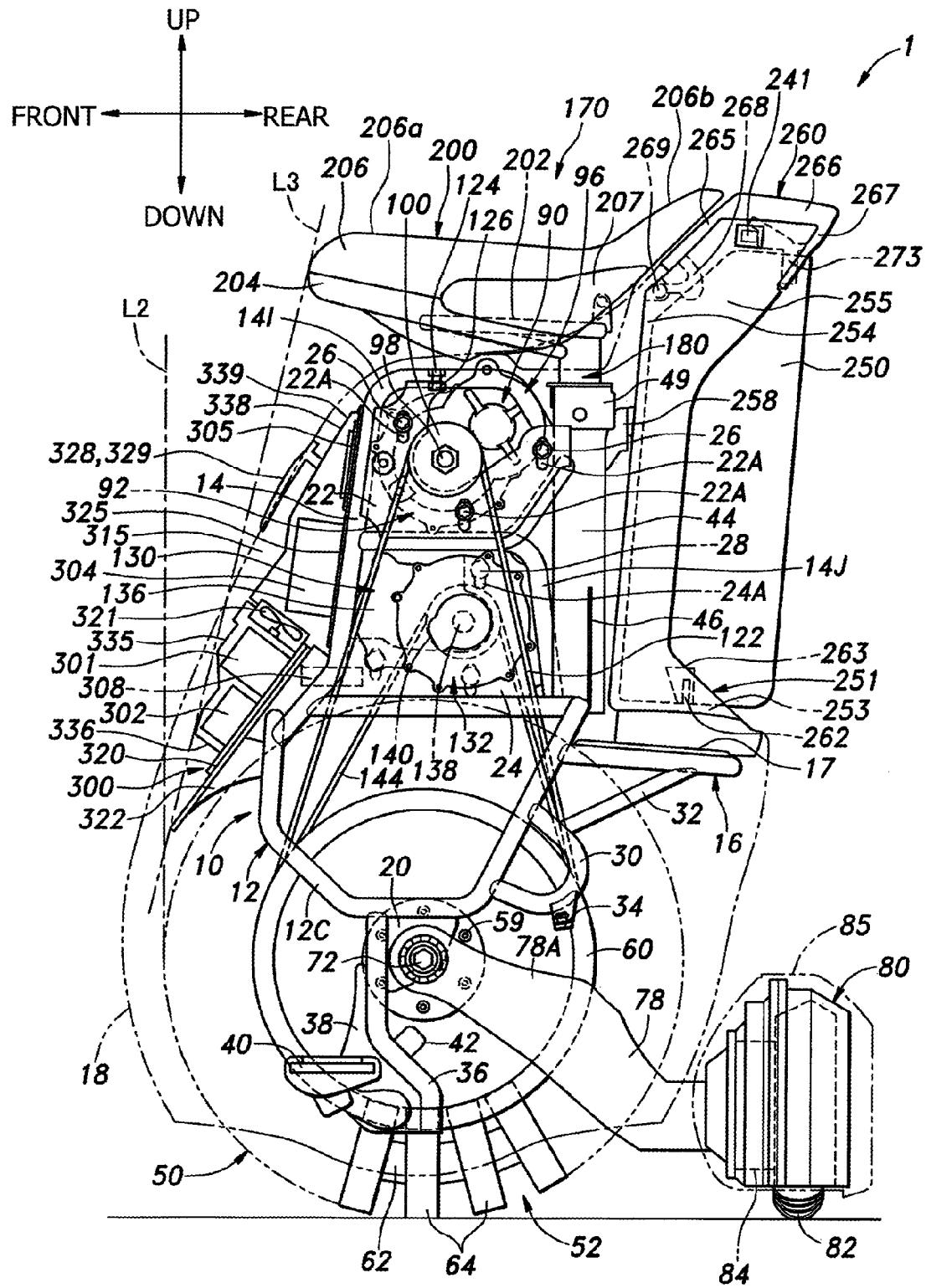
FIG. 1 is a side elevational view of an embodiment of an inverted pendulum type vehicle according to the present invention.

In the following, an embodiment of an inverted pendulum type vehicle of the present invention is described with reference to the drawings. In the following description, directions are defined with reference to an occupant seated on the inverted pendulum type vehicle.

The inverted pendulum type vehicle 1 includes a traveling unit 50 which configures a wheel, a left side driving unit 90 and a right side driving unit 130 for driving the traveling unit 50, and an electrical unit 300 for controlling the left side driving unit 90 and the right side driving unit 130. The inverted pendulum type vehicle 1 further includes a battery pack 250 for supplying electric power to the electrical unit 300, and a seat unit 170 on which an occupant is to be seated. The traveling unit 50, left side driving unit 90, right side driving unit 130, electrical unit 300, battery pack 250 and seat unit 170 are supported on a vehicle body frame 10 which configures a vehicle body skeleton.

(Vehicle Body Frame)

Figure 4:
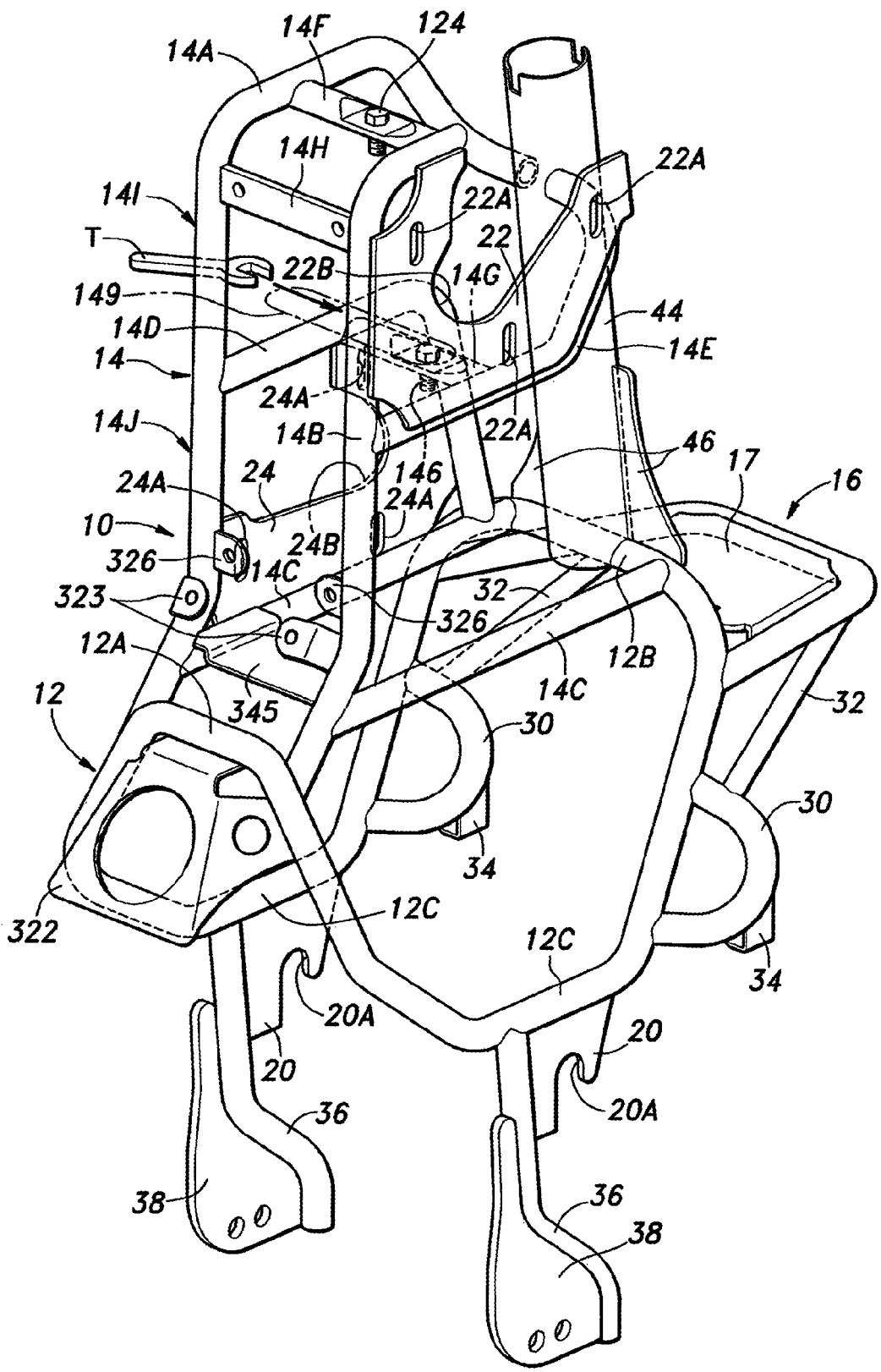
FIG. 4 is a perspective view of a vehicle body frame used in the inverted pendulum type vehicle according to the present embodiment.

As shown in FIG. 4, the vehicle body frame 10 is formed by welding a plurality of bent pipe members to each other. The pipe members may be circular pipes made of steel or aluminum. The vehicle body frame 10 includes a traveling unit supporting section 12 for supporting the traveling unit, and a driving unit supporting section 14 connected to an upper portion of the traveling unit supporting section 12 and supporting the driving unit thereon. The vehicle body frame 10 further includes a battery supporting section 16 connected to a rear portion of the traveling unit supporting section 12 and supporting the battery pack 250 thereon.

The vehicle body frame 10 includes a center post (lifting apparatus supporting member) 44 in the form of a pipe member which extends upwardly and downwardly and is open at the opposite upper and lower ends thereof. The center post 44 is connected to an upper portion of the traveling unit supporting section 12. A pair of U-shaped slits are formed at a lower end of the center post 44 such that they extend through the center post 44 in the leftward and rightward direction and continue to the lower end face of the center post 44. The traveling unit supporting section 12 is formed by bending a pipe member in an annular saddle shape and is received at rear end portions thereof in and welded to the slits.

The traveling unit supporting section 12 has a front edge portion 12A and a rear edge portion 12B in pair in the forward and backward direction extending in the leftward and rightward direction. The traveling unit supporting section 12 further has a pair of left and right side portions 12C of a substantially U shape which have left ends and right ends connecting to the left ends and the right ends, respectively, of the front edge portion and the rear edge portion and project, at central portions thereof, to the outer sides in the widthwise direction and extend downwardly. The traveling unit supporting section 12 is joined at the rear edge portion 12B thereof to the center post 44. A pair of left and right gussets 46 of a substantially triangular shape are joined to the joining portion between the rear edge portion 12B and the center post 44 to reinforce the joining portion.

Left and right step supporting pipes 36 are coupled to lower portions of the left and right side portions 12C and extend downwardly. A pair of step attachment plates 38 are coupled to the front side of the left and right step supporting pipes 36 and extend forwardly such that faces thereof are directed leftwardly and rightwardly. A pair of steps 40 for supporting the sole of the feet of the occupant are provided in a projecting manner on outer faces of the left and right step attachment plates 38 in the vehicle widthwise direction.

A pair of plate-shaped axle supporting plates 20 are joined to lower portions of the left and right side portions 12C such that they extend downwardly and have faces directed leftwardly and rightwardly. The axle supporting plates 20 are coupled at a front edge thereof to a rear portion of the step supporting pipes 36. A bearing recessed portion 20A is formed in each of the left and right axle supporting plates 20 such that it extends through the axle supporting plate 20 in the leftward and rightward direction and is open downwardly.

The driving unit supporting section 14 is formed by disposing a plurality of pipes including the center post 44 in a cage shape and is provided immediately above the traveling unit supporting section 12. The driving unit supporting section 14 has a first pipe 14A and a second pipe 14B. The first pipe 14A extends obliquely upwardly rearwardly from a right end portion of the front edge portion 12A of the traveling unit supporting section 12, extends upwardly in a curved state, is bent and then extends rearwardly, is curved and extends downwardly leftwardly and is joined to an outer face at an intermediate portion of the center post 44 in the upward and downward direction.

The second pipe 14B extends obliquely upwardly rearwardly from a left end portion of the front edge portion of the traveling unit supporting section 12, is bent and extends upwardly, and is further bent and extends rearwardly to form a free end.

A pair of third pipes 14C are joined at a front end thereof to a lower end portion of the first pipe 14A and the second pipe 14B which extend rearwardly upwardly in an inclined relationship. The third pipes 14C individually extend in the forward and backward direction and are joined at a rear end thereof to the rear edge portion 12B of the traveling unit supporting section 12. A fourth pipe 14D is coupled at a front end thereof to an intermediate portion of the portion of the first pipe 14A which extends upwardly. The fourth pipe 14D extends rearwardly, is bent and extends downwardly and is joined at a rear end thereof to the right side third pipe 14C. A fifth pipe 14E is joined at a front end thereof to an intermediate portion of the portion of the second pipe 14B which extends upwardly. The fifth pipe 14E extends rearwardly, is bent so as to extend rearwardly upwardly, is further bent so as to extend rightwardly and is joined to an outer face of an intermediate portion of the center post 44. The portion of the first pipe 14A which extends forwardly and backwardly at an upper portion thereof and an upper end portion of the second pipe 14B are joined together by a sixth pipe 14F which extends horizontally in the leftward and rightward direction.

The portion of the fourth pipe 14D which extends forwardly and backwardly and the portion of the fifth pipe 14E which extends forwardly and backwardly are joined together by a seventh pipe 14G which extends horizontally in the leftward and rightward direction. The portions of the first pipe 14A and the second pipe 14B which extend upwardly are joined together by a connection plate 14H which extends in the leftward and rightward direction. By connecting a portion of the driving unit supporting section 14 (first pipe 14A, fifth pipe 14E) to an intermediate portion (or an upper portion) of the center post 44, a seat 200 movable in the upward and downward directions can be supported stably. It is to be noted that a similar effect can be obtained also by a configuration wherein a portion of the battery supporting section 16 is connected to an intermediate portion (or an upper portion) of the center post 44.

The driving unit supporting section 14 has a cage shape having two upper and lower stages having a substantially cubic upper side cage portion 14I and a lower side cage portion 14J. The upper side cage portion 14I is disposed upwardly with respect to the driving unit supporting section 14 while the lower side cage portion 14J is disposed downwardly with respect to the driving unit supporting section 14 across the boundary provided by the seventh pipe 14G. The upper side cage portion 141 has a frame (left side frame-shaped portion) which forms a left side portion of the upper side cage portion 141 defined by an upper half portion of the second pipe 14B and the fifth pipe 14E, and a left side driving unit attachment plate 22 which is a plate-shaped gusset is coupled to the frame of the upper side cage portion 141. The lower side cage portion 14J has a frame (right side frame-shaped portion) which forms a right side portion of the lower side cage portion 14J defined by a lower half portion of the first pipe 14A, the third pipe 14C on the right side and fourth pipe 14D, and a right side driving unit attachment plate 24 which is a plate-shaped gusset is coupled to the frame of the lower side cage portion 14J. The left side driving unit attachment plate 22 and the right side driving unit attachment plate 24 are disposed in an vertically offset state and in parallel to each other on the outer sides in the vehicle body widthwise direction.

The battery supporting section 16 is formed from a pipe disposed in a channel shape open forwardly as viewed in plan, and is jointed at left and right end portions thereof to rear portions of the side portions 12C of the traveling unit supporting section 12. A shelf board 17 in the form of a flat plate is provided on the inner side of the channel shape of the battery supporting section 16. The battery supporting section 16 and the shelf board 17 exhibit a shelf shape protruding rearwardly with respect to the traveling unit supporting section 12. To a rear portion of each the side portions 12C of the traveling unit supporting section 12, a reinforcement pipe 30 formed in a U shape (semicircular shape) is joined at the opposite ends thereof. In other words, The U-shaped reinforcement pipe 30 is provided in a projecting manner at a rear portion of the side portion 12C of the traveling unit supporting section 12. An upper portion of the left and right reinforcement pipes 30 and a lower portion of the opposite left and right portions of the battery supporting section 16 are joined together by a pair of left and right linear brace pipes 32. The brace pipes 32 serve as braces to reinforce the battery supporting section 16.

The vehicle body frame 10 including the traveling unit supporting section 12, driving unit supporting section 14 and battery supporting section 16 is covered with an outer shell 18 made of a synthetic resin and indicated by imaginary lines in FIG. 1.

(Traveling Unit)

The traveling unit 50 is disposed between the left and right side portions 12C of the traveling unit supporting section 12. As shown in FIGS. 1 to 3, 6 and 7, the traveling unit 50 includes a hollow axle 54 extending horizontally in the vehicle widthwise direction (leftward and rightward direction), and left and right driving disks 58 supported for rotation independently of each other on an outer periphery of the hollow axle 54. The traveling unit 50 further includes an annular main wheel 52 penetrated by the hollow axle 54 and disposed between the left and right driving disks 58, and left and right driven pulleys 60 for a cog belt fastened to the left and right driving disks 58 by bolts 59. The left and right driving disks 58 and the left and right driven pulleys 60 are disposed on the same axial line with a central axial line of the hollow axle 54 as a common axial line. As shown in FIG. 8, a columnar pulley attaching shaft portion 58C is provided in a projecting manner at the center of an outer face of each of the driving disks 58 in the vehicle widthwise direction, and an axial through-hole 60A is formed in each of the driven pulleys 60. The driven pulley 60 is fixed to the outer side face of the driving disk 58 in the vehicle widthwise direction by the bolts 59 in a state in which the pulley attaching shaft portion 58C is inserted in the axial through-hole 60A.

Figure 7:
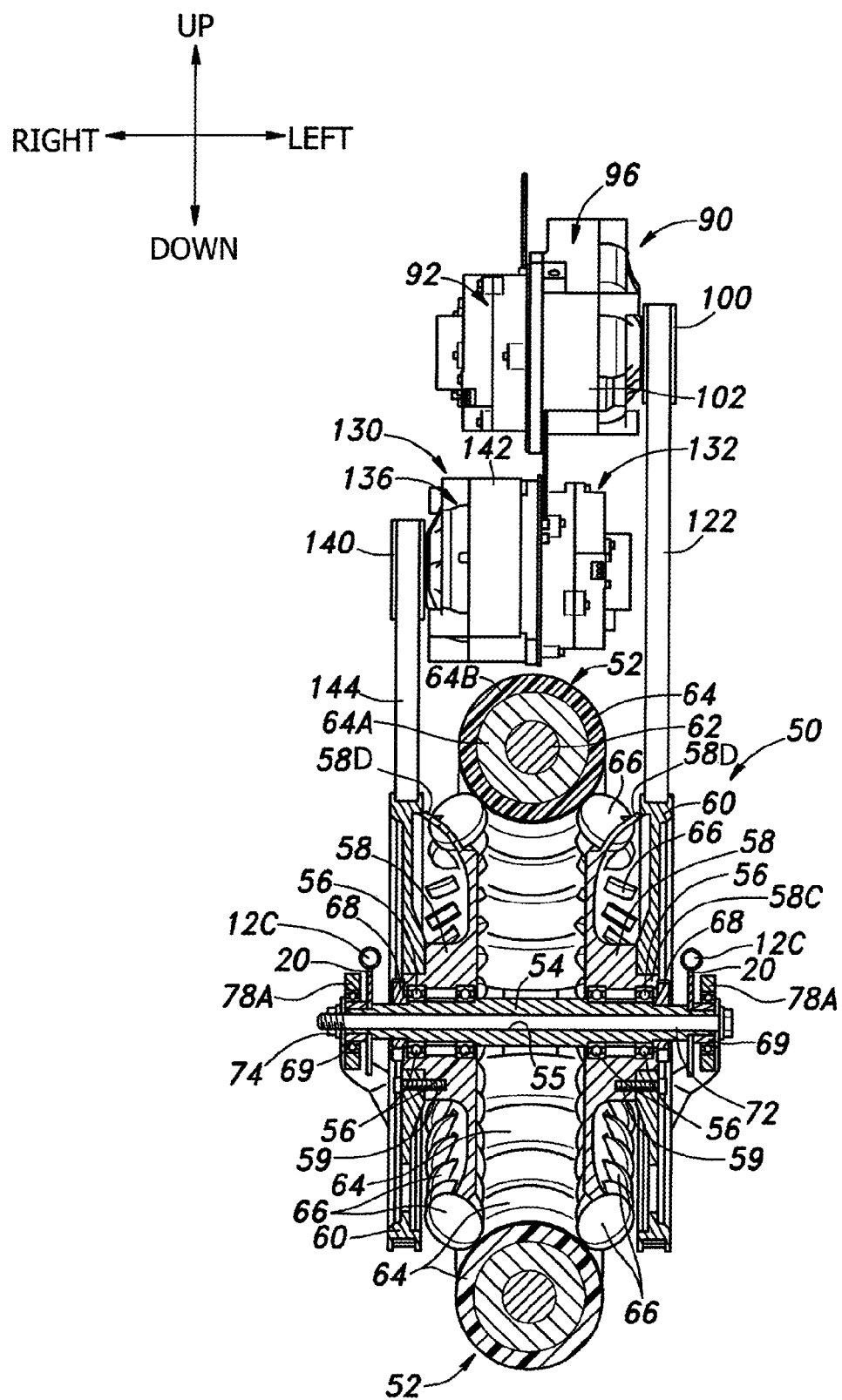
FIG. 7 is a front elevational view selectively showing the traveling unit and the driving unit of the inverted pendulum type vehicle according to the present embodiment and showing the traveling unit in a sectional view.
Figure 8:
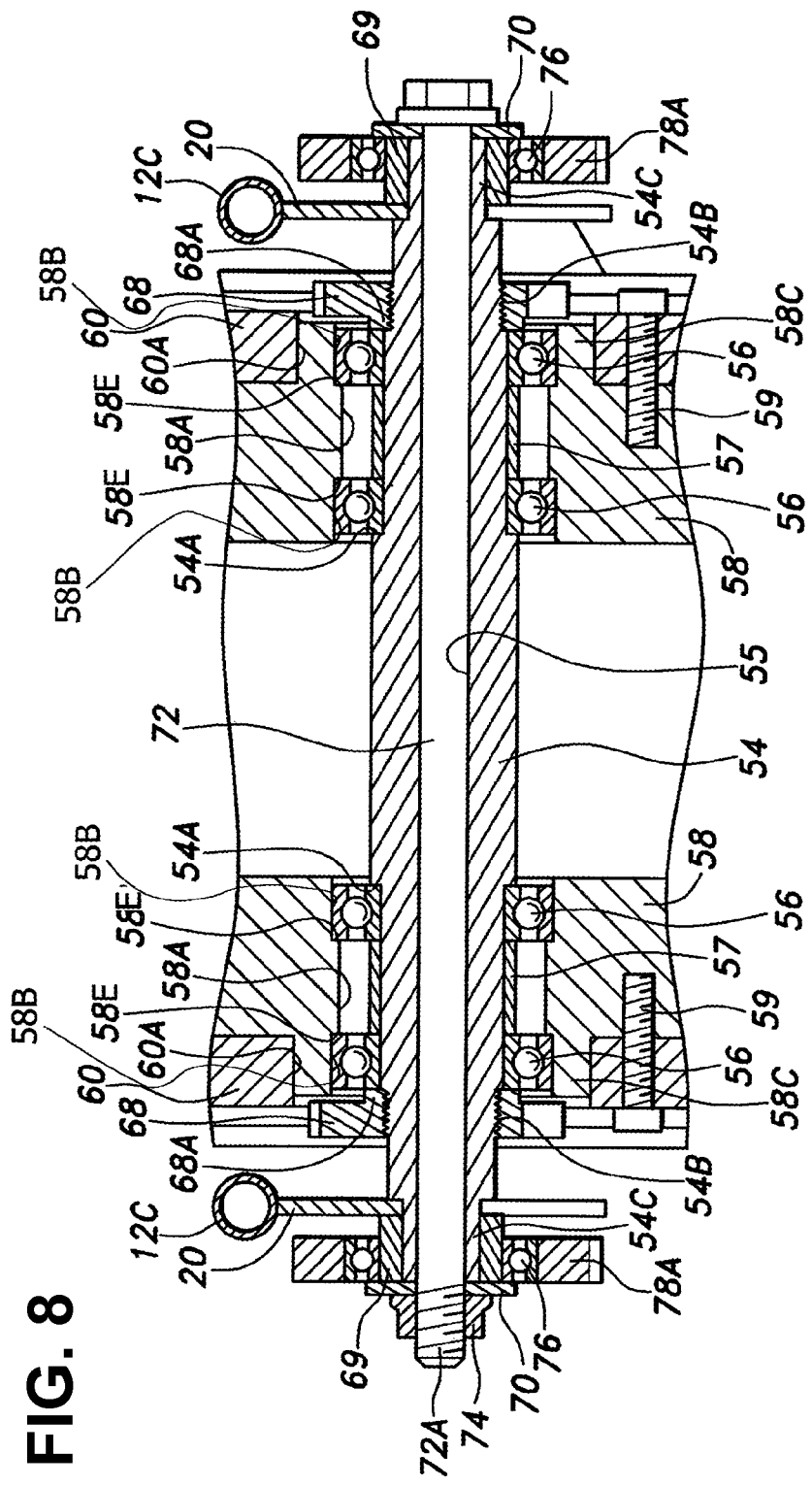
FIG. 8 is an enlarged sectional view of an axle supporting section of the inverted pendulum type vehicle according to the present embodiment.

The main wheel 52 is a driving wheel which is driven based on inverted pendulum control and is configured, as shown in FIG. 7, from a circular ring member 62 made of metal, and a plurality of driven rollers (free rollers) 64 attached to an outer periphery of the circular ring member 62. The main wheel 52 contacts with the ground at the driven rollers 64 thereof. Each of the driven rollers 64 is configured from a cylindrical metal base portion 64A mounted for rotation on the outer periphery of the circular ring member 62 and a cylindrical rubber outer peripheral portion 64B of vulcanized rubber adhered to an outer periphery of the metal base portion 64A. A plurality of driven rollers 64 are provided in the ring direction (circumferential direction) of the circular ring member 62 and can individually rotate (rotate) around a tangential line to the circular ring member 62 at the disposition position of the driven rollers 64 themselves. In short, the main wheel 52 is configured by combining the plural driven rollers 64, which can rotate independently of each other, such that they form a ring. Strictly speaking, the plural driven rollers 64 are combined so as to form a polygon having a number of angles corresponding to the number of driven rollers 64 thereby to form the main wheel 52.

The left and right driving disks 58 have a disk shape of an outer diameter smaller than a central radius of the circular ring member 62, and an outer peripheral portion thereof is a conical outer peripheral portion 58D which has a substantially truncated conical shape. A plurality of driving rollers 66 made of metal are supported for rotation at equal distances in the circumferential direction on the conical outer peripheral portion 58D. The driving rollers 66 of the left side driving disk 58 and the driving rollers 66 of the right side driving disk 58 are disposed in a leftwardly and rightwardly symmetrical relationship with each other, and the centers of the driving rollers 66 are disposed in a twisted relationship with the center of rotation of the driving disk 58. Consequently, the left and right driving rollers 66 have leftwardly and rightwardly symmetrical shapes and have an inclined disposition similar to teeth of a helical gear wheel.

The hollow axle 54 supports the left and right driving disks 58 for rotation independently of each other through two pairs of ball bearings (radial ball bearings) 56. The ball bearings 56 are disposed in a spaced relationship from each other in the direction of the axial line of the hollow axle 54 on an outer periphery of the hollow axle 54. As shown in FIG. 8, the left and right driving disks 58 have an axial through-holes 58A. Increased diameter portions 58B which are increased in diameter in an offset state are formed at opening ends of the axial through-holes 58A on the opposite sides in the direction of the axial line. A collar member 57 is fitted on an outer periphery of the hollow axle 54, and the two ball bearings 56 are fitted at the inner race thereof on the hollow axle 54 in such a manner as to sandwich the collar member 57 therebetween and fitted at the outer race thereof with the increased diameter portions 58B. The two ball bearings 56 abut at an end face of the outer race thereof with positioning stepped portions 58E formed at end portions of the increased diameter portions 58B and abut at an end face of the inner race thereof with the collar member 57 such that they are positioned in the direction of the axial line and disposed in a spaced relationship from each other. It is to be noted that the axial length of the collar member 57 and the dimension by which the positioning stepped portions 58E formed in pair on the opposite sides of the axial through-holes 58A of the axial through-holes 58A in the direction of the axial line are equal to each other.

A pair of positioning stepped portions 54A are formed in a spaced relationship by a predetermined distance from each other in the direction of the axial line on the outer periphery of the hollow axle 54 by reducing the diameter on the end portion sides of the hollow axle 54. The distance between the left and right driving disks 58 in the direction of the axial line is set by abutment of an end face of the inner race of the ball bearing 56 on the inner side in the direction of the axial line from between the two ball bearings 56 with the positioning stepped portion 54A.

A nut 68 is screwed with each of male threaded portions 54B formed in the proximity of left and right end portions of the hollow axle 54. By tightening of the nut 68, a ring-shaped protrusion 68A formed on the inner diameter side of the nut 68 presses an end face of the inner race of the ball bearing 56 on the outer side in the direction of the axial line from between the two ball bearings 56. Consequently, the inner races of the two ball bearings 56 and the collar member 57 are sandwiched by the positioning stepped portion 54A and the nut 68 and positioned in the direction of the axial line of the driving disk 58 with respect to the hollow axle 54. Consequently, the driving disk 58 is supported for rotation by a supporting structure of low frictional resistance.

The outer diameter of the nut 68 (flange outer diameter) is formed greater than the outer diameter of the outer race of the ball bearing 56. In short, the outer diameter of the nut 68 is formed greater than the inner diameter of the axial through-hole 58A of the driving disk 58. Consequently, The disposition position of the ball bearing 56 is hidden by the nut 68 thereby to form a labyrinth seal so that dust becomes less likely to enter the ball bearing 56.

Meanwhile, the axial through-hole 60A of the driven pulley 60 is formed greater than the outer diameter of the nut 68. In short, the axial through-hole 60A has an inner diameter which allows the nut 68 to extend through the axial through-hole 60A in the direction of the axial line. Consequently, in a state in which the nut 68 is screwed with the hollow axle, the driven pulley 60 can be mounted on and removed from the driving disk 58.

Figure 2:
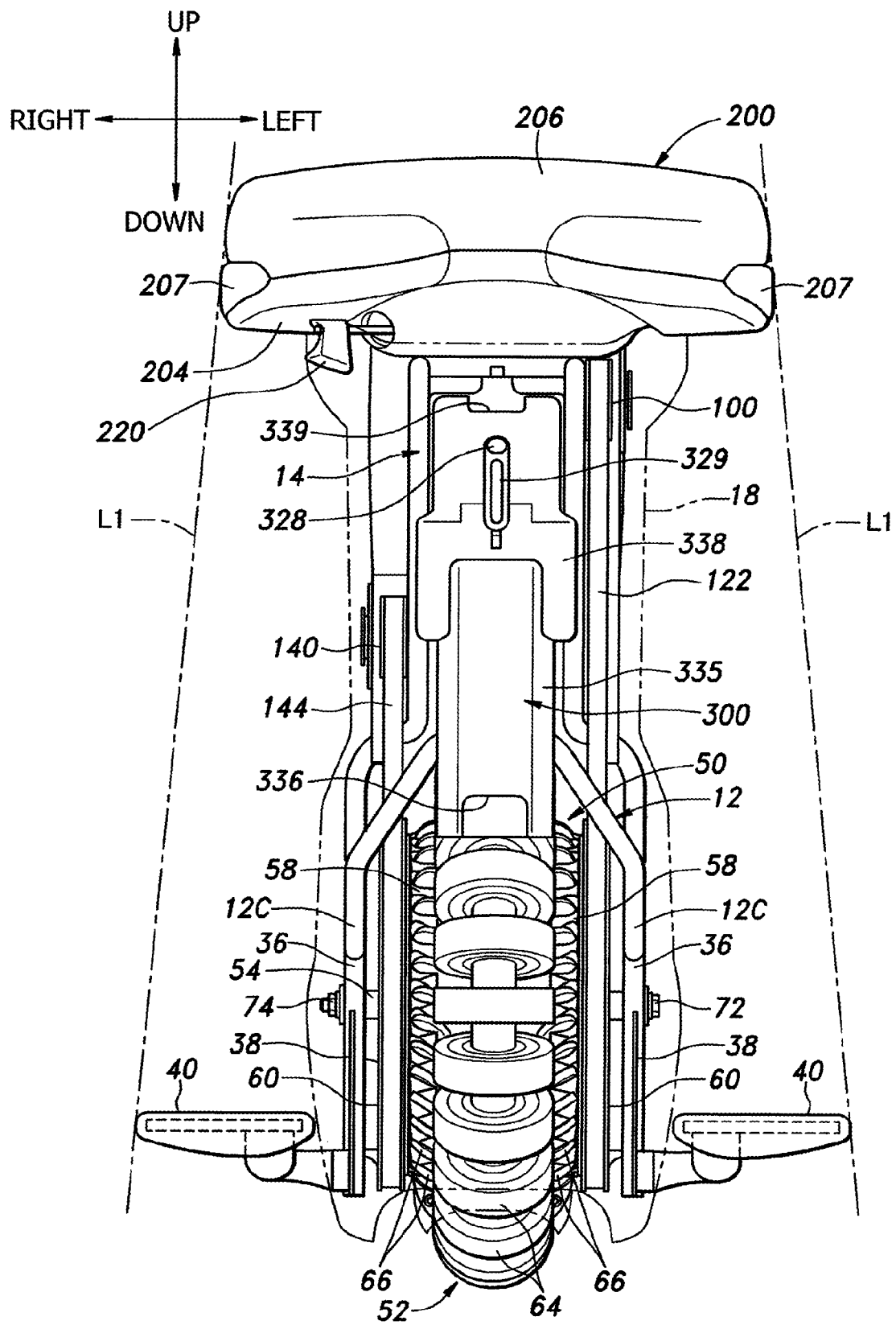
FIG. 2 is a front elevational view of the inverted pendulum type vehicle according to the present embodiment.
Figure 6:
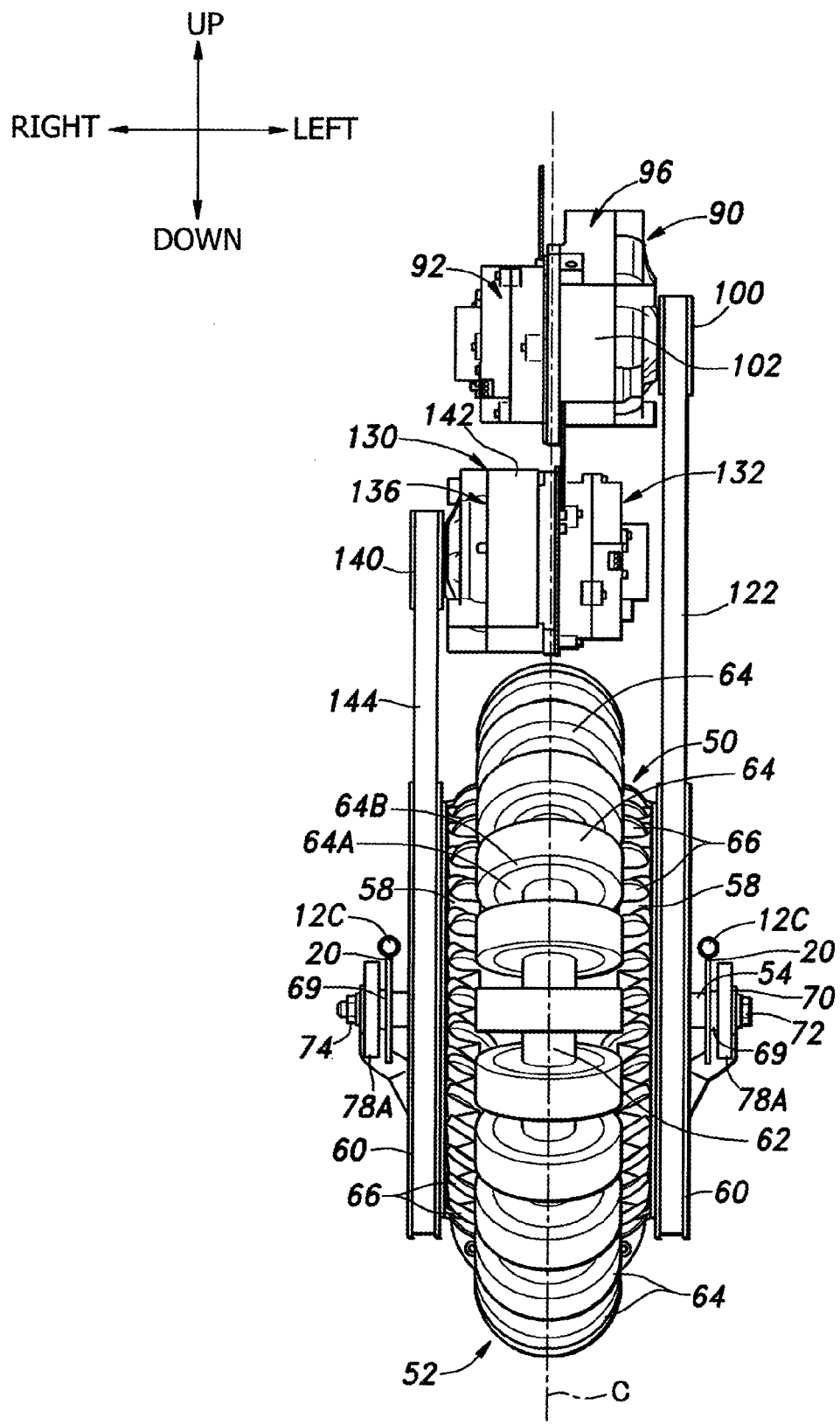
FIG. 6 is a front elevational view selectively showing a traveling unit and a driving unit of the inverted pendulum type vehicle according to the present embodiment.

The left and right driving disks 58 assembled to the hollow axle 54 in such a manner as described above are supported on a substantially same axial line (concentrically) in such a manner that the main wheel 52 is sandwiched from the opposite left and right sides by the ring-shaped roller train groups by the left and right driving rollers 66 as shown in FIGS. 2 and 6. Consequently, the main wheel 52 is supported between the left and right driving disks 58 and prevented from coming out from between them.

More particularly, an outer circumferential face of the driving rollers 66 of the driving disk 58 contacts in such a manner as to be pressed against an outer circumferential face of the rubber outer peripheral portion 64B of the driven rollers 64 of the main wheel 52. The contact position between the driving rollers 66 and the driven rollers 64 is leftwardly and rightwardly symmetrical between the left and right driving disks 58. Further, the contact position is on that portion of the outer circumferential face of the driven roller 64 which is positioned inwardly (rotational center side) in a diametrical direction with respect to a diametrical position of the circular ring member 62 and the outer circumferential face of the driving roller 66 at the location. This signifies that the dimension of the minimum distance in the direction of the axial line between the driving rollers 66 of the left and right driving disks 58 is smaller than the outer diametrical dimension of the driven rollers 64.

The driving rollers 66 of the left and right driving disks 58 sandwich the driven rollers 64 from the opposite left and right sides to support the main wheel 52 in a no-axis state between the left and right driving disks 58 and can rotate (revolve) around the center of the main wheel 52 itself together with the left and right driving disks 58.

An assembly (subassembly) as the traveling unit 50 including the left and right driving disks 58, left and right driven pulleys 60, hollow axle 54 and main wheel 52 is configured in such a manner as described above.

In this subassembly, the dimension of the distance between the left and right driving disks 58 in the direction of the axial line is uniquely set to an appropriate value depending upon the distance in the direction of the axial line between the two left and right positioning stepped portions 54A formed on the outer periphery of the hollow axle 54. Consequently, the setting accuracy of friction between the driving rollers 66 of the driving disk 58 and the driven rollers 64 of the main wheel 52 is improved, and management of the same is facilitated.

The traveling unit 50 is disposed between the left and right side portions 12C of the traveling unit supporting section 12 and is supported by the bearing recessed portions 20A of the axle supporting plates 20 at the opposite ends of the hollow axle 54. A reduced diameter end portion 54C is formed at the opposite left and right ends of the hollow axle 54 such that it is reduced in diameter by formation of a stepped portion. The left and right reduced diameter end portions 54C are inserted in the bearing recessed portions 20A such that the stepped portions thereof abut with the axle supporting plates 20. A collar member 69 is fitted on the end portion sides passing through the bearing recessed portions 20A of the left and right reduced diameter end portions 54C. A headed bolt 72 is inserted in the central through-hole 55 of the hollow axle 54 such that it passes a washer 70 from one end. An end portion of the headed bolt 72 projects from the other end side of the central through-hole 55, passes through the washer 70 and is screwed with a nut 74. The head of the headed bolt 72 and the nut 74 press the collar members 69 through the washers 70. Consequently, each of the axle supporting plates 20 is sandwiched between the stepped portion of the reduced diameter end portion 54C and the headed bolt 72 or the nut 74 with the collar member 69 and the washer 70 interposed therebetween.

Assembly of the traveling unit 50 configured as a subassembly to the traveling unit supporting section 12 is carried out in the following manner. First, the traveling unit 50 is disposed between the left and right side portions 12C of the traveling unit supporting section 12. Then, an outer periphery of the reduced diameter end portions 54C formed at the opposite ends of the hollow axle 54 is fitted from the lower side (opening side) into the downwardly open bearing recessed portion 20A (refer to FIG. 4) of the axle supporting plates 20 fixed to the left and right side portions 12C.

Then, the collar member 69 is fitted with an outer periphery of one of the reduced diameter end portions 54C of the hollow axle 54 on the outer side in the direction of the axial line with respect to the portion of the reduced diameter end portion 54C at which the reduced diameter end portion 54C engages with the axle supporting plate 20. Then, the headed bolt 72 serving as a supporting shaft is inserted from one of the axial ends of the hollow axle 54 into the central through-hole 55 of the hollow axle 54 in a state in which the washer 70 is sandwiched between an end face of the collar member 69 and the headed bolt 72. The headed bolt 72 is projected at an end thereof outwardly from the central through-hole 55 through the central through-hole 55.

Then, the other collar member 69 is fitted with an outer periphery of the other reduced diameter end portion 54C of the hollow axle 54 on the other side in the direction of the axial line with respect to the portion of the reduced diameter end portion 54C which engages with the axle supporting plate 20. Then, the nut 74 is tightened to an end threaded portion 72A of the headed bolt 72 which projects outwardly from the central through-hole 55 with the other washer 70 sandwiched between the end face of the collar member 69 and the nut 74. The assembly of the traveling unit 50 to the traveling unit supporting section 12 is completed therewith.

The left and right driving disks 58, left and right driven pulleys 60, hollow axle 54 and main wheel 52 can be unitized without complicating the structure in this manner, and the unit can be attached simply to the vehicle body frame 10.

The traveling unit 50 may include a tail wheel unit 80 supported on the hollow axle 54 through a tail wheel arm 78 as in the present embodiment. The tail wheel arm 78 extends substantially linearly at a rear end portion thereof and has a front end portion bifurcated into forked portions 78A. The tail wheel arm 78 is supported for pivotal motion on the collar members 69 at the forked portions 78A through ball bearings (radial ball bearing) 76. The collar members 69 are mounted between the forked portions 78A on the left and right reduced diameter end portions 54C of the hollow axle 54 so as to dispose the left and right driving disks 58, left and right driven pulleys 60 and the main wheel 52 of the traveling unit 50. Consequently, the tail wheel arm 78 can extend behind the main wheel 52 without interfering with the left and right driving disks 58, left and right driven pulleys 60 and main wheel 52.

A rear side limit stopper 34 is attached to the reinforcement pipe 30. The rear side limit stopper 34 abuts with an upper face of the tail wheel arm 78 to restrict upward pivotal motion of the tail wheel arm 78 around the hollow axle 54 (pivotal motion of the tail wheel arm in the counterclockwise direction in a state in which the vehicle is viewed from leftwardly (refer to FIG. 1)). In other words, a maximum rearward rollover angle (maximum rearward inclination angle) of the vehicle body frame 10 is set.

A front side limit stopper 42 is attached to the step supporting pipe 36. The front side limit stopper 42 abuts with a lower face of the tail wheel arm 78 to restrict downward pivotal motion of the tail wheel arm 78 around the hollow axle 54 (pivotal motion of the tail wheel arm in the clockwise direction in a state in which the vehicle is viewed from leftwardly (refer to FIG. 1)). In other words, a forward maximum rollover angle (maximum forward inclination angle) of the vehicle body frame 10 is set.

The tail wheel unit 80 is supported at a rear end of the tail wheel arm 78. The tail wheel unit 80 includes a tail wheel 82 supported on the tail wheel arm 78, an electric motor 84 for driving the tail wheel 82 to rotate, and an outer shell 85 for covering the tail wheel 82 and the electric motor 84. The tail wheel arm 78 can pivot around the axial line of the hollow axle 54, and the tail wheel unit 80 places the tail wheel 82 into contact with the ground by the weight of the tail wheel unit 80 itself.

The tail wheel 82 may be an omnidirectional wheel configured from a ring member supported for rotation on the tail wheel arm 78 and a free roller attached for rotation on an outer periphery of the ring member. The ring member is driven to rotate around the center axial line extending in the vehicle body forward and backward direction in a state in which the free roller contacts with the ground, namely, around the center axial line perpendicular to the axial line of the hollow axle 54 (axial line of the center of rotation of the main wheel 52) as viewed in plan, by the electric motor 84.

(Driving Unit)

Figure 3:
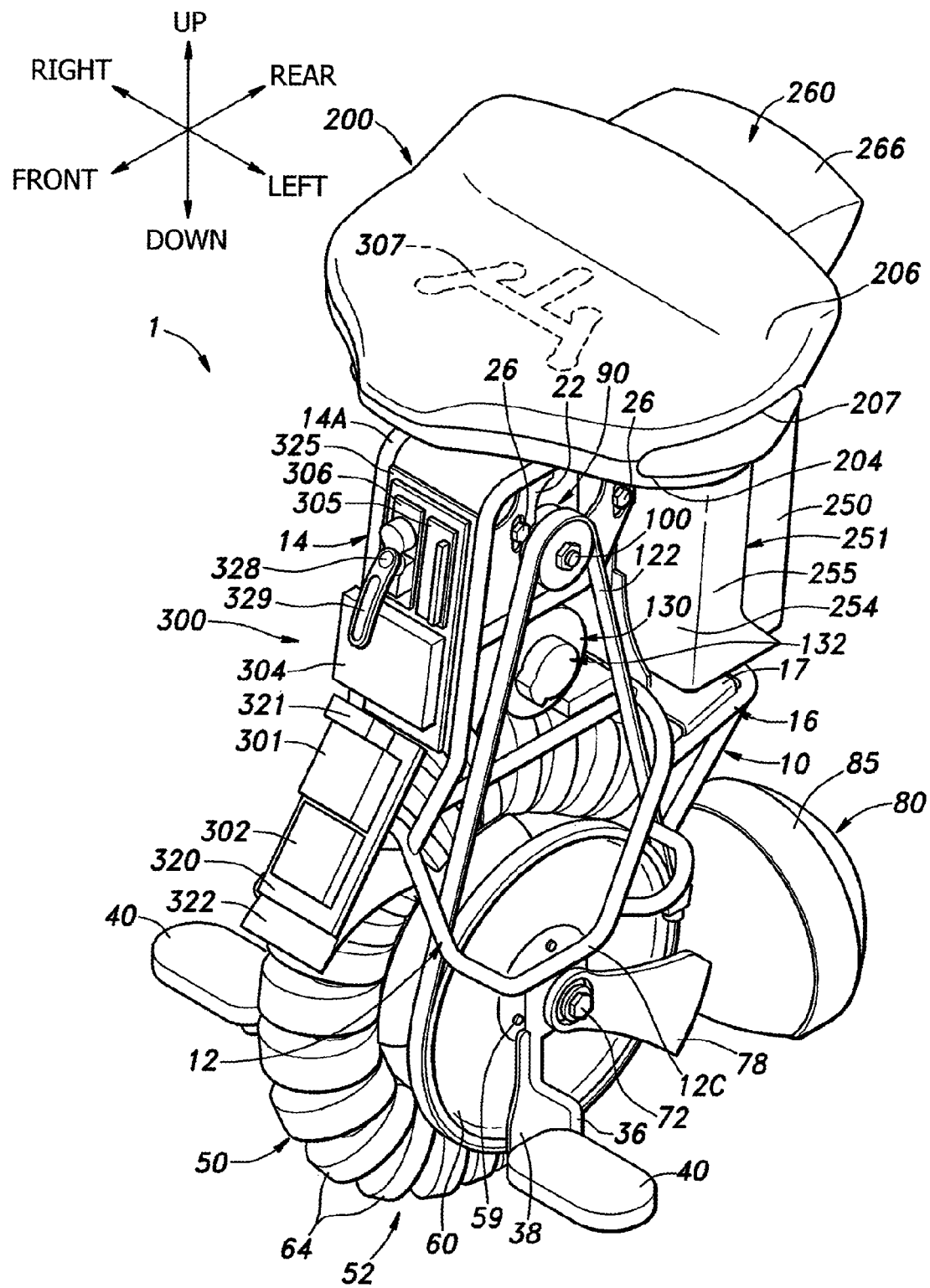
FIG. 3 is a perspective view of the inverted pendulum type vehicle according to the present embodiment.
Figure 9:
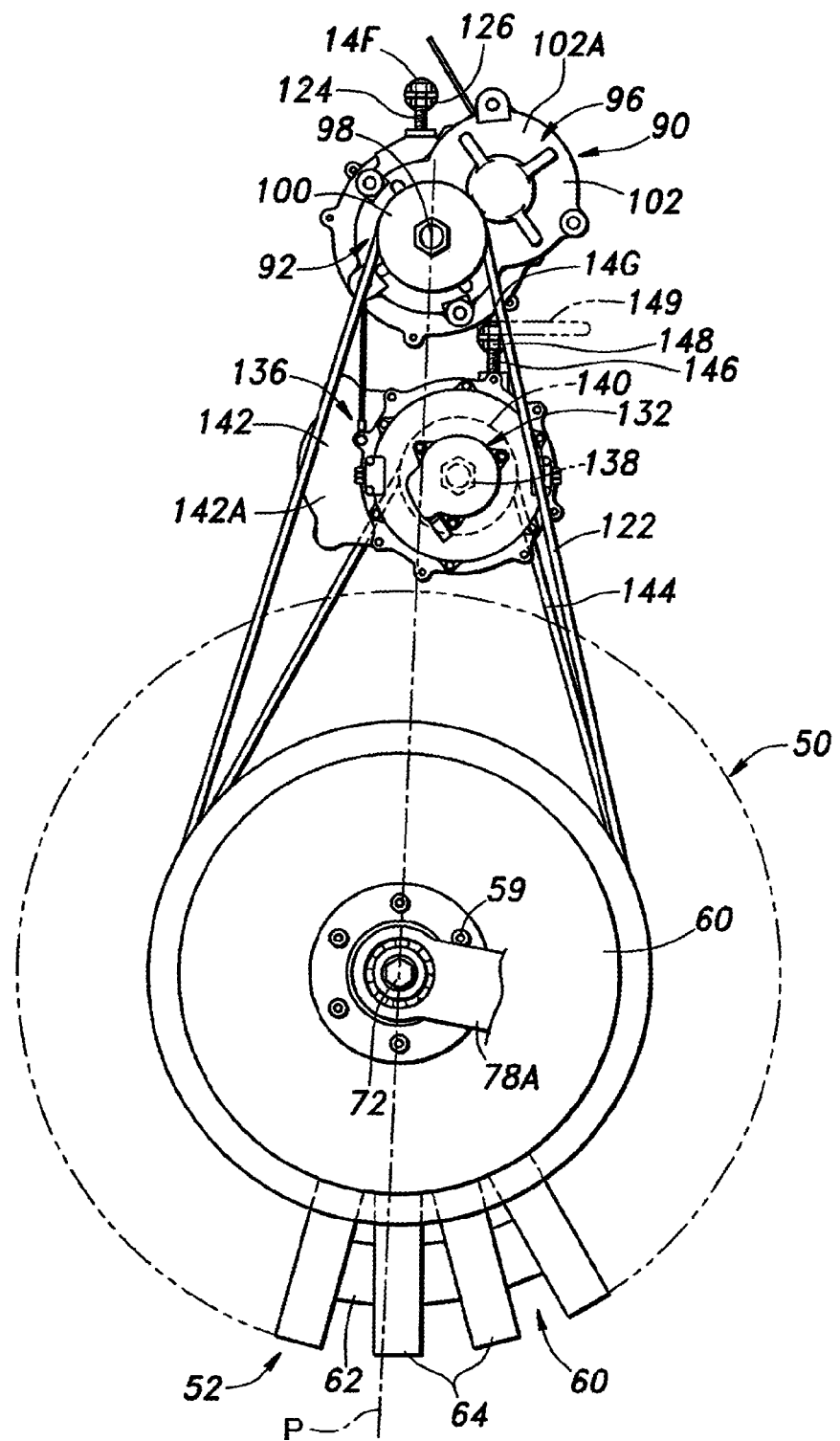
FIG. 9 is a side elevational view selectively showing the traveling unit and the driving unit of the inverted pendulum type vehicle according to the present embodiment and showing the traveling unit in a sectional view.

The left side driving unit 90 is disposed in the upper side cage portion 141 as shown in FIGS. 1 and 3. The left side driving unit 90 is configured, as shown in FIGS. 6, 7 and 9, an electric motor 92, a reduction gear 96 connected to an output power shaft (motor output power shaft) 94 of the electric motor 92, and a driving pulley 100 for a cog belt disposed leftwardly of the reduction gear 96 and connected to an output power shaft (reduction gear output power shaft) 98 of the reduction gear 96.

Figure 10:
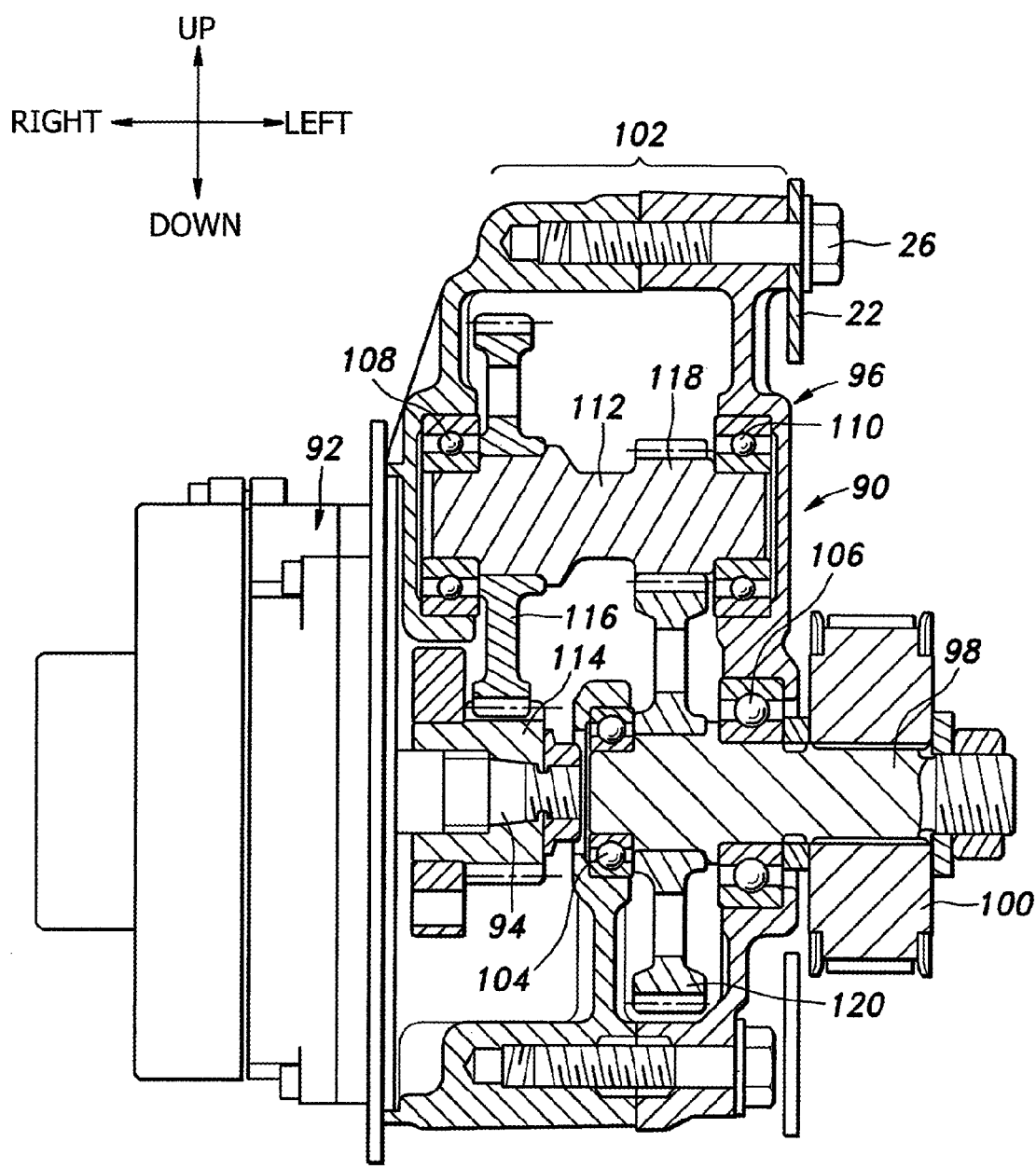
FIG. 10 is a sectional view of a reduction gear used in the driving unit of the inverted pendulum type vehicle according to the present embodiment.

The reduction gear 96 is of the gear wheel type having two parallel axes and includes a gear box 102 of the wet type having an enclosed structure directly connected to the output power shaft side of the electric motor 92 as shown in FIG. 10. The reduction gear 96 includes an end portion of the motor output power shaft 94, the reduction gear output power shaft 98, an intermediate shaft 112, a small gear wheel 114, a large gear wheel 116, another small gear wheel 118, and a large gear wheel 120 in the gear box 102. The output power shaft 98 is disposed for rotation on the same axial line with the motor output power shaft 94 by ball bearings 104 and 106. The intermediate shaft 112 is disposed for rotation on an axial line parallel to the reduction gear output power shaft 98 by ball bearings 108 and 110. The small gear wheel 114 is fixed to an end portion of the motor output power shaft 94. The large gear wheel 116 is fixed to the intermediate shaft 112 and meshes with the small gear wheel 114. The small gear wheel 118 is fixed to the intermediate shaft 112, and the large gear wheel 120 is fixed to the reduction gear output power shaft 98 and meshes with the small gear wheel 118.

In the reduction gear 96, a disposition portion of the intermediate shaft 112 thereof projects outwardly in a radial direction from the outer face of the electric motor 92, and this projecting portion 102A is positioned on the obliquely upper rear side with respect to the position of the center axial line of the electric motor 92.

An end portion of the reduction gear output power shaft 98 projects to the opposite side (left side) of the gear box 102 to the side of the electric motor 92, and the driving pulley 100 is fixed to the end portion. In other words, the reduction gear 96 is disposed between the electric motor 92 and the reduction gear output power shaft 98.

A plurality of threaded holes (not shown) are formed in a left wall of the gear box 102, and a plurality of (in the example shown, three) bolt penetrating holes 22A are formed in the left side driving unit attachment plate 22 as shown in FIG. 4. Attachment bolts 26 extending through the bolt penetrating holes 22A are screwed in the threaded holes to fix the reduction gear 96, namely, the left side driving unit 90, to the left side driving unit attachment plate 22. It is to be noted that the left side driving unit 90 can be placed into the upper side cage portion 141 from the right side, at which the left side driving unit attachment plate 22 does not exist and which is open, beginning with the reduction gear 96.

The reduction gear output power shaft 98 projects outwardly through a cutaway portion 22B (refer to FIG. 4) formed in the left side driving unit attachment plate 22, and the driving pulley 100 is attached to a position of the outwardly projecting end of the reduction gear output power shaft 98 very proximate to the outer side face of the left side driving unit attachment plate 22. A cog belt 122 extends between the driving pulley 100 and the driven pulleys 60. Since the driving pulley 100 around which the cog belt 122 extends is positioned on the left side driving unit attachment plate 22 side together with the reduction gear output power shaft 98, the left side power transmission section including the driving pulley 100 is supported more firmly by the left side driving unit attachment plate 22. The left side driving unit attachment plate 22 is an attachment plate of the left side driving unit 90 to the vehicle body frame 10 and simultaneously serves as a gusset which acts to raise the rigidity of the upper side cage portion 141 and raise the supporting rigidity of the left side power transmission section.

It is to be noted that, since the cutaway portion 22B of the left side driving unit attachment plate 22 is so sized that the driving pulley 100 in a state in which it is fixed to the reduction gear output power shaft 98 can pass therethrough in the vehicle widthwise direction, the left side driving unit 90 wherein the driving pulley 100 is fixed to the reduction gear output power shaft 98 can be assembled to the upper side cage portion 141.

Each of the bolt penetrating holes 22A is an elongated hole elongated in the upward and downward direction, and the fixing position of the left side driving unit 90 to the left side driving unit attachment plate 22 in the upward and downward direction can be changed within the range of the elongated hole. By changing the fixing position of the left side driving unit 90 in the upward and downward direction, the tension to be applied to the cog belt 122 can be changed. In short, the bolt penetrating hole 22A cooperates with the mounting bolt 26, which extends through the bolt penetrating hole 22A, so as to serve as a guide portion for the movement of the left side driving unit 90 in the upward and downward direction, and the tension to be applied to the cog belt 122 is changed by change of the fixing position of the left side driving unit 90 in the upward and downward direction.

An adjustment bolt 124 is attached to the sixth pipe 14F such that it extends upwardly and downwardly through the sixth pipe 14F as shown in FIGS. 4 and 9. The adjustment bolt 124 is screwed in a threaded hole (not shown) formed in an upper wall of the gear box 102.

By changing the screwed amount of the adjustment bolt 124 into the threaded hole in a state in which the mounting bolts 26 are loosened, the entire left side driving unit 90 moves upwardly or downwardly with respect to the upper side cage portion 141 (sixth pipe 14F). By the upward or downward movement of the left side driving unit 90, the tension to be applied to the cog belt 122 can be adjusted. By fastening the adjustment bolt 124 to the sixth pipe 14F by a lock nut 126, the tension variation of the cog belt 122 can be suppressed.

The right side driving unit 130 is disposed in the lower side cage portion 14J as shown in FIGS. 1 and 3. The right side driving unit 130 is equivalent to the left side driving unit 90 reversed leftwardly and rightwardly. As shown in FIGS. 6, 7 and 9, the right side driving unit 130 is configured from an electric motor 132, a reduction gear 136 attached to the output power shaft (not shown) side (right side) of the electric motor 132, and a driving pulley 140 for a cog belt attached to an output power shaft (reduction gear output power shaft) 138 hereinafter described of the reduction gear 136.

The reduction gear 136 is of the gear wheel type of two parallel shafts and includes a wet type gear box 142 of an enclosed structure directly coupled to the output power shaft side of the electric motor 132. The gear box 142 has an internal structure similar to that of the reduction gear 96 including the reduction ratio except that it has a leftwardly and rightwardly inversed disposition, and therefore, detailed description of the internal structure thereof is omitted herein. The reduction gear 136 projects, at a disposition portion of an intermediate shaft (not shown) thereof, outwardly in a radial direction from an outer profile of the electric motor 132. This projecting portion 142A is positioned on the front side of the vehicle body with respect to the position of the axial line of the center of the electric motor 132.

The reduction gear output power shaft 138 projects, at an end portion thereof, to the opposite side (right side) of the gear box 142 to the side of the electric motor 132, and the driving pulley 140 is fixed to the end portion thereof. In other words, the reduction gear 136 is disposed between the electric motor 132 and the reduction gear output power shaft 138.

A plurality of threaded holes (not shown) are formed in the right wall of the gear box 142, and a plurality of (in the example shown, three) bolt penetrating holes 24A are formed in the right side driving unit attachment plate 24. By screwing mounting bolts 28 penetrating the bolt penetrating holes 24A into the threaded holes, the reduction gear 136, namely, the right side driving unit 130, is fixed to the right side driving unit attachment plate 24. It is to be noted that the right side driving unit 130 can be placed into the lower side cage portion 14J from the left side, on which the right side driving unit attachment plate 24 does not exist and which is open, beginning with the reduction gear 136.

The reduction gear output power shaft 138 passes through a cutaway portion 24B (refer to FIG. 4) formed in the right side driving unit attachment plate 24 and projects to the outer side, and the driving pulley 140 is attached to a position of the outer side projecting end of the reduction gear output power shaft 138 very close to the outer side face of the right side driving unit attachment plate 24. An endless cog belt 144 extends between and around the driving pulley 140 and the right side driven pulley 60. The driving pulley 140 around which the cog belt 144 extends is positioned on the side of the right side driving unit attachment plate 24 together with the reduction gear output power shaft 138. Therefore, the right side power transmission section including the driving pulley 140 is supported firmly by the right side driving unit attachment plate 24. The right side driving unit attachment plate 24 servers as an attachment plate for the right side driving unit 130 to the vehicle body frame 10 and simultaneously acts as a gusset to raise the rigidity of the lower side cage portion 14J and raise the supporting rigidity of the right side power transmission section.

Each bolt penetrating hole 24A is an elongated hole elongated in the upward and downward direction, and the fixing position of the right side driving unit 130 to the right side driving unit attachment plate 24 in the upward and downward direction can be changed within the range of this elongated hole. This serves as adjustment mechanism for the initial tension. By changing the fixing position of the right side driving unit 130 in the upward and downward direction, the tension to be applied to the cog belt 144 can be changed. In other words, the bolt penetrating hole 24A cooperates with the mounting bolt 28 extending through the bolt penetrating hole 24A to serve as a guide portion for movement of the right side driving unit 130 in the upward and downward direction. Further, the tension to be applied to the cog belt 144 is changed by changing the fixing position of the right side driving unit 130 in the upward and downward direction.

An adjustment bolt 146 is attached to the seventh pipe 14G such that it extends upwardly and downwardly through the seventh pipe 14G as shown in FIGS. 4 and 9. The adjustment bolt 146 is screwed in a threaded hole (not shown) formed in an upper wall of the gear box 142.

By changing the screwed amount of the adjustment bolt 146 into the threaded hole in a state in which the mounting bolts 28 are loosened, the right side driving unit 130 moves upwardly or downwardly with respect to the lower side cage portion 14J (seventh pipe 14G). The tension to be applied to the cog belt 144 can be adjusted by this upward or downward movement of the right side driving unit 130. By fastening the adjustment bolt 146 to the seventh pipe 14G by a lock nut 148, the tension variation of the cog belt 144 can be suppressed.

The adjustment bolts 124 and 146 hang the left side driving unit 90 and the right side driving unit 130 from above and support the left side driving unit 90 and the right side driving unit 130 at positions at which they are opposed to the cog belts 122 and 144 in a direction in which the tension is generated. Therefore, positioning of the left side driving unit 90 and the right side driving unit 130 upon tension adjustment is facilitated.

It is to be noted that such setting is used that, even if the left side driving unit 90 on the upper stage is positioned at its lowermost position, a space 149 into which a tool T or a jig for turning the adjustment bolt 146 can be inserted is assured between a bottom portion of the left side driving unit 90 and the head of the adjustment bolt 146 on the lower stage. Where the lower frame (fourth pipe 14D, fifth pipe 14E) of the upper side cage portion 141 serves as an upper frame of the lower side cage portion 14J and the adjustment bolt 146 is attached to the seventh pipe 14G which bridges the fourth pipe 14D and the fifth pipe 14E as in the case of the embodiment shown in the figures, the head of the adjustment bolt 146 is accessed from the side (right side) to which the left side driving unit attachment plate 22 is not attached. Consequently, the tension to the cog belt 144 can be adjusted by an operation of the adjustment bolt 146 without being obstructed by the cog belt 122. It is to be noted that, by accessing also the adjustment bolt 124 on the upper stage from the side (right side) to which the left side driving unit attachment plate 22 is not attached, tension adjustment of the cog belts 122 and 144 can be carried out from the same side.

The left and right driven pulleys 60 have an equal number of teeth, and the left and right driving pulleys 100 and 140 have an equal number of teeth smaller than the number of teeth of the left and right driven pulleys 60. By the difference in number of teeth between the driven pulleys 60 and the driving pulleys 100 and 140, secondary speed reduction by an equal reduction ratio between the left and the right is carried out. Although the left and right cog belts 122 and 144 are different in length from each other, since the reduction ratio between the driven pulleys 60 and the driving pulleys 100 and 140 depends upon the ratio of numbers of teeth independently of the belt length, the driven pulleys 60 and the driving pulleys 100 and 140 can be made common between the left and the right.

In this manner, the left side driving unit 90 and the right side driving unit 130 are disposed in an offset state on the two upper and lower stages while they are reversed leftwardly and rightwardly relative to each other, and overlap in most part thereof with each other as viewed in plan. The electric motor 92 of the left side driving unit 90 on the upper stage is provided in a displaced relationship to the right side opposite to the disposition side of the reduction gear 96 with respect to a vehicle body center line C (refer to FIG. 6) in the vehicle widthwise direction (leftward and rightward direction). Meanwhile, the electric motor 132 of the right side driving unit 130 on the lower stage is provided in a displaced relationship to the left side opposite to the arrangement side of the reduction gear 136 with respect to the vehicle body center line C (refer to FIG. 6) in the vehicle widthwise direction (leftward and rightward direction).

By this disposition, the electric motor 92 of the left side driving unit 90 on the upper stage is positioned just above the reduction gear 136 of the right side driving unit 130 on the lower stage. Further, the reduction gear 96 of the left side driving unit 90 on the upper stage is positioned just above the electric motor 132 of the right side driving unit 130 on the lower stage.

In the inverted pendulum type vehicle 1 of the present embodiment, the left side driving unit 90 and the right side driving unit 130 are disposed in an offset state on the two upper and second stages at positions above the main wheel 52 and overlap at most part thereof with each other as viewed in plan as described hereinabove. Therefore, in comparison with a case in which the electric motors 92 and 132 are disposed in a juxtaposed relationship in the vehicle widthwise direction at the same height on the vehicle, a greater disposition space in the vehicle widthwise direction can be taken for each of the left side driving unit 90 and the right side driving unit 130 in the same vehicle body width.

Consequently, upsizing (increase in torque) of the electric motors 92 and 132 and addition of the reduction gears 96 and 136 become possible without increasing the vehicle body width. As the reduction gears 96 and 136 are installed, driving torque of the driving disk 58 and hence driving torque of the main wheel 52 can be increased. Besides, since the reduction gears 96 and 136 are of the two parallel shaft type in which the output power shafts (94) of the electric motors 92 and 132 and the output power shafts 98 and 138 of the reduction gears 96 and 136 are disposed on the same axial line, unitization of the electric motors 92 and 132 in a small mass can be anticipated with a compact structure. Further, the left side driving unit 90 and the right side driving unit 130 having output power torque ready for a model of different driving torque can be disposed suitably without changing the vehicle classification.

Further, since the left side driving unit 90 and the right side driving unit 130 are disposed on the two upper and lower stages, the position of the center of gravity of the inverted pendulum type vehicle 1 can be positioned upwardly and the inverted pendulum control of the inverted pendulum type vehicle 1 is facilitated.

Since the left side driving unit 90 and the right side driving unit 130 are disposed in a leftward and rightwardly reversed state on the two upper and lower stages, the balance in weight between the left and the right is enhanced. Besides, the electric motors 92 and 132, which make a heat source, are disposed in a spaced relationship from each other in the vehicle widthwise direction, and heat damage by neighboring disposition of the heat sources can be avoided. Further, since the electric motors 92 and 132 are positioned on the opened side on which the left side driving unit attachment plate 22 and the right side driving unit attachment plate 24 do not exist, also the cooling performance is enhanced advantageously and wiring and connection of a harness for electric power (not shown) to the electric motors 92 and 132 are facilitated.

While the projecting portion 102A of the reduction gear 96 of the left side driving unit 90 is positioned on the obliquely upward rearward side with respect to the position of the center axial line of the electric motor 92, the projecting portion 142A of the reduction gear 136 of the right side driving unit 130 is positioned forwardly with respect to the position of the center axial line of the electric motor 132. In other words, the projecting directions of the projecting portions 102A and 142A of the reduction gears 96 and 136 are different between the upper stage and the lower stage. Therefore, effective utilization of the space and adjustment in weight balance of the vehicle body in the forward and backward direction can be anticipated.

Where the projecting portion 102A of the reduction gear 96 on the upper stage is positioned on the obliquely upward rearward side with respect to the position of the center axial line of the electric motor 92, the position of the center of gravity of the inverted pendulum type vehicle 1 is positioned further upwardly, and inverted pendulum control of the inverted pendulum type vehicle 1 is facilitated. That the projecting portion 142A of the reduction gear 136 of the right side driving unit 130 is positioned forwardly with respect to the position of the center axial line of the electric motor 132 coincides with that the center of rotation of the reduction gear output power shaft 138 of the right side driving unit 130 is positioned in a displaced relationship to the vehicle body rear side from the center of rotation of the reduction gear output power shaft 98 of the left side driving unit 90. This contributes to space-saving by effective utilization of the space.

Since the left side driving unit 90 and the right side driving unit 130 are assemblies of the electric motors 92 and 132 and the reduction gears 96 and 136, respectively, the gear boxes 102 and 142 of the reduction gears 96 and 136 which are moist chambers by lubricating oil can be aggregated on the side of the left side driving unit 90 and the right side driving unit 130 separately from the cog belt systems of the dry type (driving pulleys 100 and 140, cog belts 122 and 144 and left and right driven pulleys 60). Consequently, the maintenance performance of the left side driving unit 90, right side driving unit 130 and the driving systems by the cog belt systems is enhanced.

Further, assembly of the running and driving systems can be carried out readily only by the following procedure. In particular, the subassembly of the left and right driving disks 58 and the left and right driven pulleys 60 assembled to the hollow axle 54 and the main wheel 52 assembled between the left and right driving disks 58, namely, the traveling unit, is attached to the axle supporting plates 20 by the bolt 72 and the nut 74. Then, the left side driving unit 90 and the right side driving unit 130 to which the driving pulleys 100 and 140 are assembled, respectively, are attached to the driving unit supporting section 14. Further, the cog belts 122 and 144 are wrapped around the driving pulleys 100 and 140 and the left and right driven pulleys 60.

As shown in FIG. 9, the center of rotation of the reduction gear output power shaft 98 of the left side driving unit 90 is located on a vertical line P which passes the center of the hollow axle 54. However, the center of rotation of the reduction gear output power shaft 138 of the right side driving unit 130 is positioned in a displaced relationship to the vehicle body rear side with respect to the center of rotation of the vertical line P which passes the center of the hollow axle 54 as viewed in a side elevation.

(Seat Unit)

Figure 5:
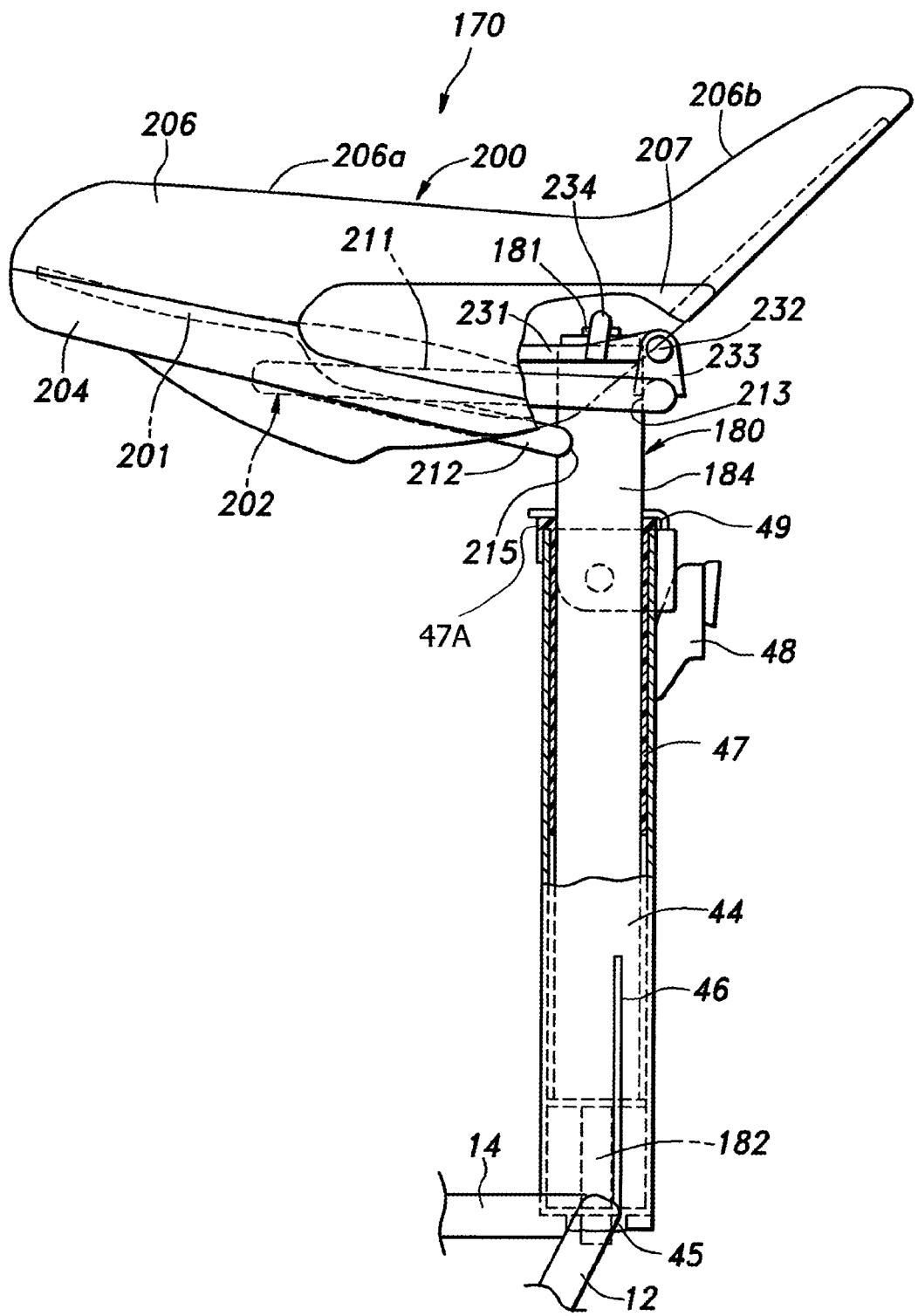
FIG. 5 is a side elevational view, partly in section, of a seat supporting section of the inverted pendulum type vehicle according to the present embodiment.

As shown in FIG. 5, a cylindrical bush 47 made of resin is fitted in an upper half portion of the inside of the center post 44. The cylindrical bush 47 has an annular flange portion 47A extending outwardly in diametrical directions at an upper end thereof. The cylindrical bush 47 is sandwiched at the flange portion 47A thereof between an upper end face of the center post 44 and a retaining member 49 fixed to the center post 44 such that the cylindrical bush 47 is supported on the center post 44 against movement in the direction of the axial line.

A telescopic strut 180 is inserted in the center post 44 and serves as a support post for supporting the seat for upward and downward movement. In particular, the telescopic strut 180 is disposed between the driving units 90 and 130 and the battery pack 250 in the vehicle body forward and backward direction. Consequently, when the telescopic strut 180 is used to adjust the height of the seat, the space of the vehicle body is utilized effectively to avoid upsizing of the vehicle body while the driving units 90 and 130 and the battery pack 250 which are comparatively heavy can be disposed in a good balance forwardly and backwardly of the telescopic strut 180 (seat 200) thereby to maintain a good gravity center balance of the vehicle body. The telescopic strut 180 is configured from a gas spring with a lock (lifting apparatus of the cylinder type) and is inserted in the center post 44 with a piston rod 182 positioned on the lower side while an end portion of the piston rod 182 is fixed to a bottom portion of the center post 44 by a nut 45. A cylinder tube 184 of the telescopic strut 180 is fitted for sliding movement with the cylindrical bush 47 such that it can move upwardly and downwardly with respect to the vehicle body frame 10.

An upper end of the cylinder tube 184 projects upwardly from the center post 44. The cylinder tube 184 is fixed at the upper end thereof to a seat frame 202 of the seat (saddle) 200. The seat 200 is configured from the above-described seat frame 202 formed in a substantially quadrangular frame shape by bending a pipe member. The seat 200 is configured further from a base member 201 in the form of a plate fixed to the seat frame 202, and a seat main body 206 attached to an upper portion of the base member 201 and having a cushioning property. The seat 200 is configured further from a seat bottom cover 204 attached to a lower portion of the base member 201, and side guard members 207 attached to the opposite left and right sides of the seat bottom cover 204. A seat lifting lever (operation lever) 198 (refer to FIG. 11) for carrying out unlocking of the telescopic strut 180 is disposed on one side portion of the seat bottom cover 204.

The side guard members 207 are made of a comparatively hard material (here, rubber) and are provided so as to be positioned on the most outer sides in the widthwise direction (leftward and rightward direction) of the seat 200. Consequently, even if the seat main body 206 is made of a comparatively soft material (here, polyurethane) taking the riding comfort and so forth into consideration, the occupant can assume a stabilized riding posture by grasping the left and right side guard members 207 as occasion demands when the occupant gets on the inverted pendulum type vehicle 1. Further, as shown in FIG. 2, the components of the vehicle body are provided so as to be positioned on the inner side of an imaginary line L1 which connects outer edges of the left and right side guard members 207 and outer edges of the left and right steps 40 to each other. In other words, the seat 200 and the steps 40 are provided with a width greater than that of the outer shell 18 in the leftward and rightward direction. Consequently, also in a state in which the vehicle body rolls over to the left or right, only one of the side guard members 207 and one of the steps 40 contact with the floor face or the like, and therefore, occurrence of damage or the like to the components of the vehicle body can be prevented.

In the seat supporting structure described above, the seat 200 is attached to the telescopic strut 180 such that it is positioned at an uppermost portion of the vehicle body. The driving units 90 and 130 and part of the battery unit are disposed on the lower side of the seat 200 as shown also in FIG. 1. Consequently, the vehicle body can be compactified while it can be maintained in a good gravity center balance. If the seat lifting lever 198 of the telescopic strut 180 is operated, then the locking of the telescopic strut 180 is canceled and the cylinder tube 184 is moved upwardly by an internal gas pressure of the telescopic strut 180. Consequently, the height of the seat main body 206 can be adjusted freely in accordance with the physique, preference and so forth of the occupant.

(Seat Lifting Mechanism)

Figure 11:
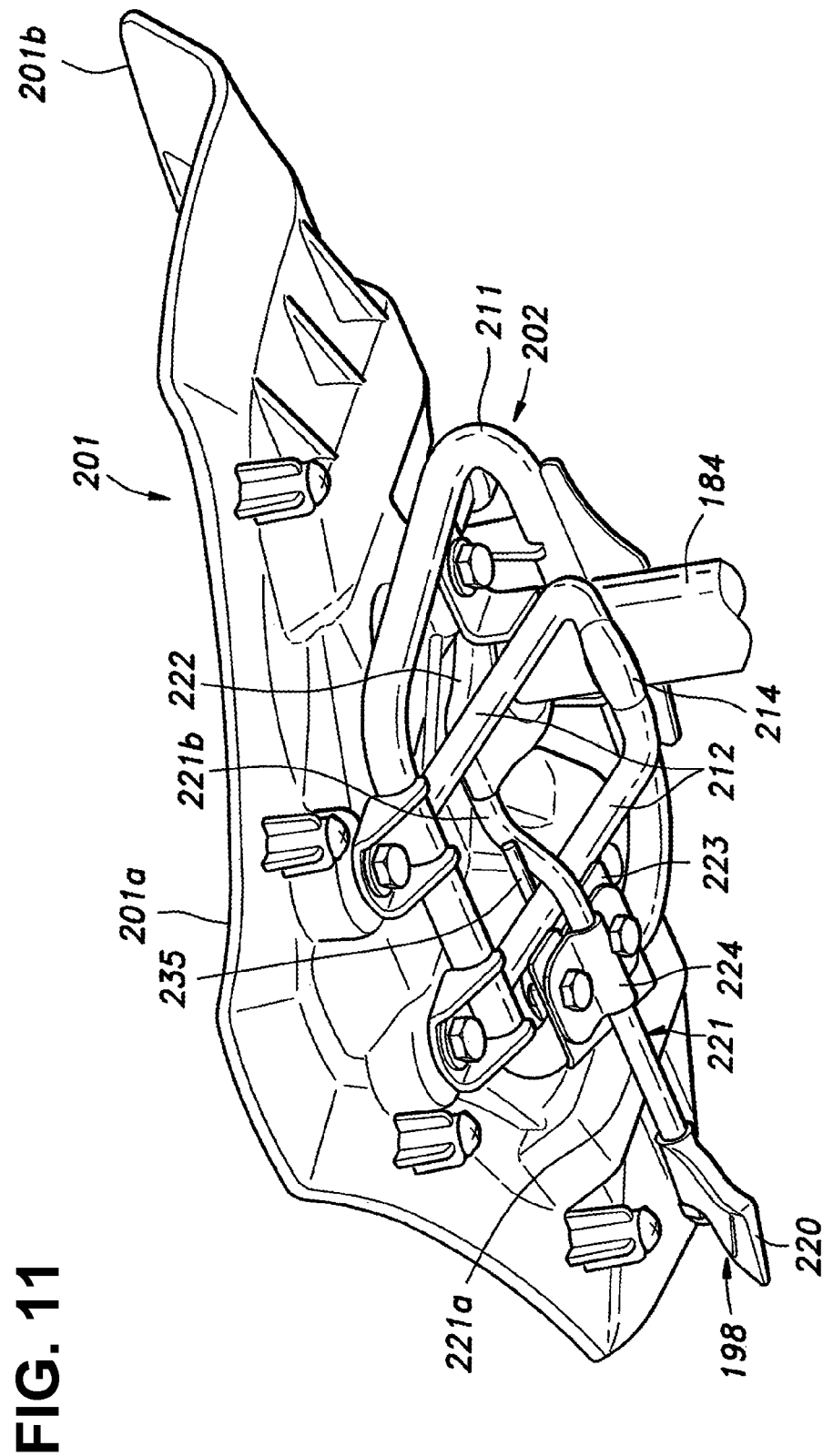
FIG. 11 is a lower side perspective view showing a lifting mechanism for a seat.
Figure 12:
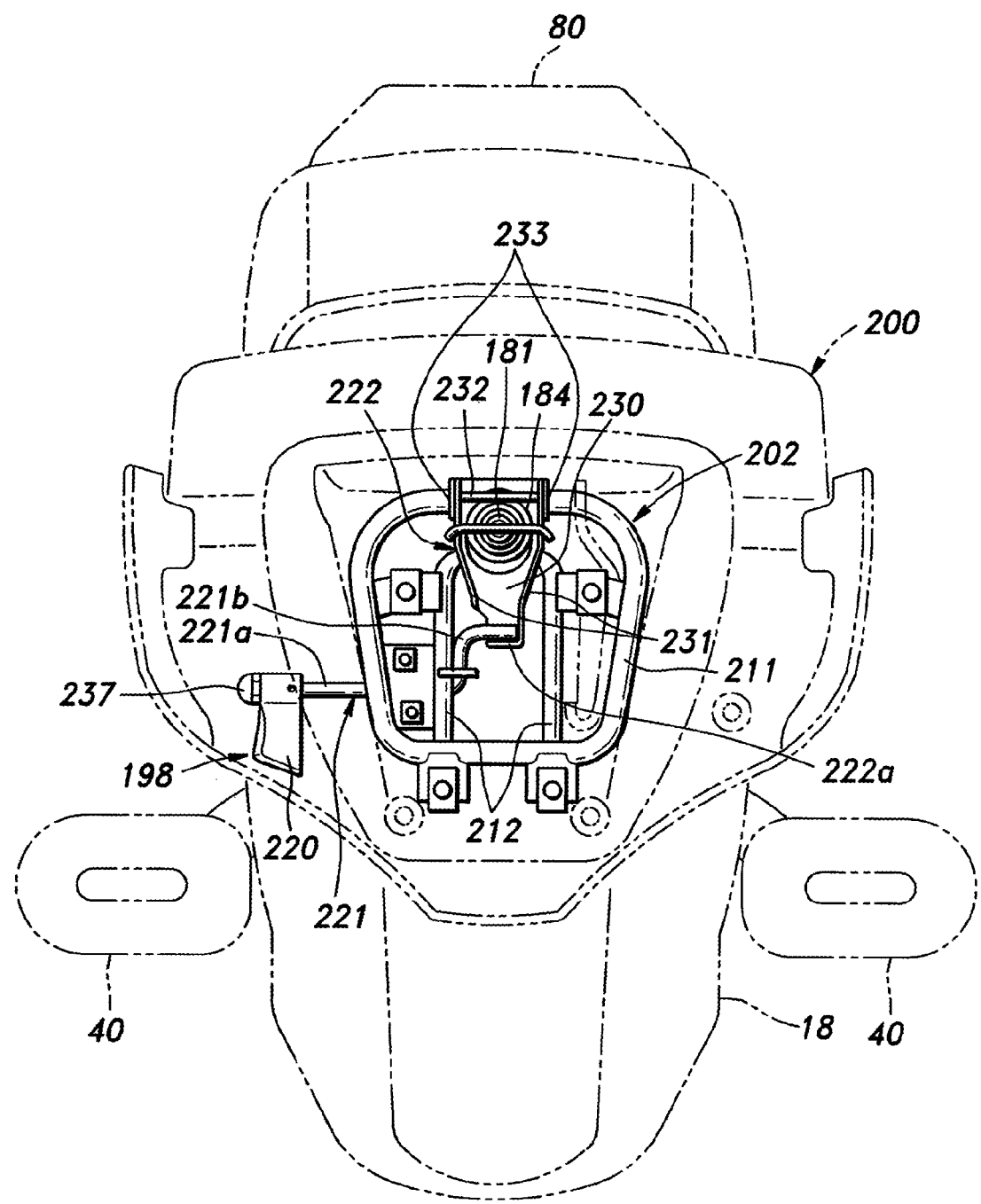
FIG. 12 is a plan view showing the lifting mechanism for a seat.

Now, details of a lifting mechanism for the seat 200 which uses the telescopic strut 180 are described with reference to FIGS. 11 to 15. As shown in FIGS. 11 and 12, the seat frame 202 includes an annular main frame 211 fastened to a lower face of the base member 201 by a plurality of bolts and open in the upward and downward directions, and a pair of sub frames 212 extending substantially in parallel to each other in such a manner as to cross the main frame 211 in the vehicle body forward and backward direction. The main frame 211 is connected at a rear portion thereof to a first connection base portion 213 (refer to FIG. 5) which is positioned on a rear side circumferential face of the cylinder tube 184 of the telescopic strut 180.

The rear ends of the sub frames 212 are curved to the inner side and connected to each other to form a U-shaped connection portion 214. This connection portion 214 is connected to a second connection base portion 215 (refer to FIG. 5) which is positioned on a front side circumferential face of the cylinder tube 184. The second connection base portion 215 is positioned downwardly with respect to the connection base portion 213 to which the main frame 211 is connected. Further, the sub frames 212 are connected at a front end thereof to the inner peripheral face of a front portion of the main frame 211.

Figure 13:
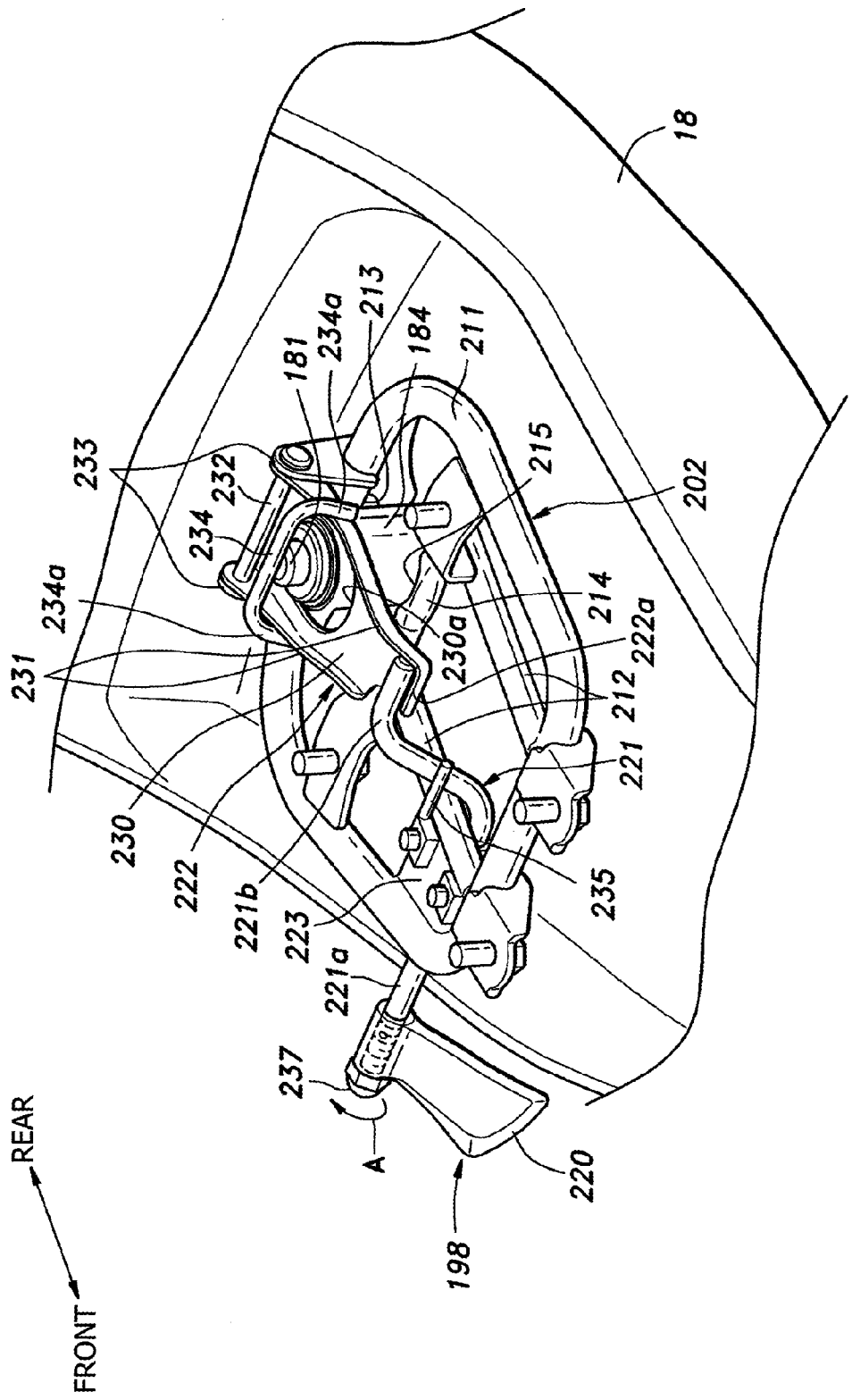
FIG. 13 is an upper side perspective view showing the lifting mechanism for a seat which is at a lowered position.

As shown in FIG. 13, the seat lifting lever 198 includes a lever arm (first arm) 222 having a crank shape and an operation arm (second arm) 212 for engaging with the lever arm 221. On the lever arm 221, a lever portion 221b on the left end side is rocked in response to an operation input to a straight portion 221a on the right end side which has an operating piece (operation portion) 220 provided at a terminal end thereof. The operation arm 222 pivots in response to a rocking motion of the lever portion 221b to depress an unlocking button (lift adjustment button) 181 of the telescopic strut 180.

The straight portion 221a of the lever arm 221 extends in the leftward and rightward direction and is attached for pivotal motion to an attachment plate 223 by a mounting bracket 224 having a U-shaped supporting portion. The attachment plate 223 extends between the main frame 211 and one of the sub frames 212 below the seat frame 202 as shown in FIG. 11. The lever portion 221b is curved rearwardly from a left end of the straight portion 221a, and an end of the lever portion 221b further extends in the leftward and rightward direction and engaged with a front side upper portion of the operation arm 222.

As shown in FIG. 13, the operation arm 222 includes a main body portion 230 in the form of a flat plate in which an opening 230a through which an upper portion of the cylinder tube 184 extends is formed, and a peripheral wall portion 231 provided projecting upwardly on left and right edges and a front edge of the main body portion 230. The peripheral wall portion 231 is cut away at a right front portion thereof such that the lever portion 221b can abut with an upper face of the main body portion 230. The lever portion 221b is locked by the front side of the peripheral wall portion 231 such that coming off thereof from the upper face of the main body portion 230 is prevented.

A pivot shaft 232 extends in the leftward and rightward direction and is fitted in left and right rear portions of the peripheral wall portion 231. The pivot shaft 232 is supported by a pair of supporting pieces 233 provided in an upwardly projecting manner from a rear portion of the main frame 211. The pivot shaft 232 is positioned on the vehicle body rear side with respect to the telescopic strut 180, and an engaging portion 222a of the operation arm 222 with the lever portion 221b (front side upper portion of the main body portion 230) is positioned on the vehicle body front side with respect to the telescopic strut 180 (refer to FIG. 5). By such a configuration as just described, a higher lever ratio (ratio between the distance from the pivot shaft 232 to the engaging portion 222a with the lever portion 221b and the distance from the pivot shaft 232 to the abutting portion with the unlocking button 181) can be assured in the limited space below the seat main body 206, and the occupant can depress the unlocking button 181 with lower force. Further, the operation arm 222 is disposed in a space between the sub frames 212 in pair and pivotally moves in the space. In other words, with the seat frame 202, it is possible to assure the strength of the disposition space of the seat lifting lever 198 below the seat 200 and eliminate an influence of disturbance to a lever operation which can possibly occur upon movement of a moving body.

A pushdown rod 234 is provided on the operation arm 222 such that it crosses the opening 230a of the main body portion 230 in the leftward and rightward direction above the opening 230a. A lower face of the pushdown rod 234 is in a normally contacting state with the unlocking button 181 which is biased upwardly. A pair of leg portions 234a are formed at the opposite ends of the pushdown rod 234 such that they extend substantially in the vertical direction. The leg portions 234a are fixed to left and right circumferential faces of the peripheral wall portion 231.

Figure 14:
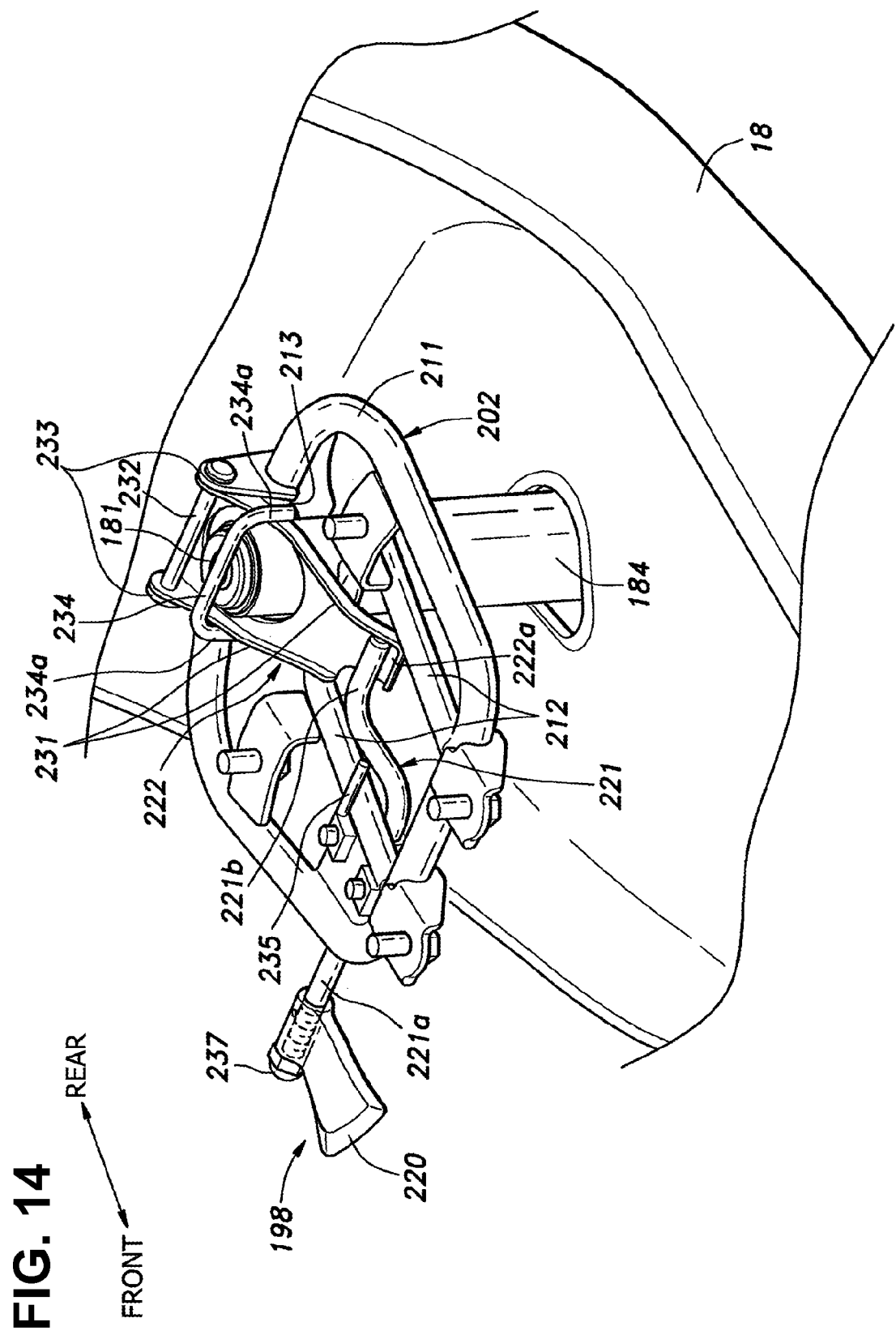
FIG. 14 is an upper side perspective view showing the lifting mechanism for a seat which is at a raised position.

When the height of the seat 200 is to be adjusted, the lever arm 221 can be pivoted by the occupant lifting up the front end of the operating piece 220 (refer to an arrow mark A in FIG. 13). At this time, the lever portion 221b of the lever arm 221 is rocked downwardly to press the front side of the operation arm 222 downwardly thereby to pivot the operation arm 222 downwardly. As a result, the unlocking button 181 is depressed by the pushdown rod 234 moved downwardly and the cylinder tube 184 of the telescopic strut 180 whose locking is cancelled moves upwardly as shown in FIG. 14. The occupant can cancel the depression of the unlocking button 181 to place the telescopic strut 180 into a locked state again by canceling the operation of the operating piece 220 when the seat 200 moves upwardly to a desired height. It is to be noted that, when the position of the seat 200 is to be moved downwardly, the occupant may depress the upper face of the seat 200 downwardly in the state in which the front end of the operating piece 220 is lifted upwardly and cancel the operation of the operating piece 220 at a desired height. Further, pivotal motion of the lever arm 221 in the opposite direction (direction in which the operation arm 222 is not pressed) is restricted by a pivotal motion restricting pin 235 which abuts with the lever portion 221b.

Figure 15:
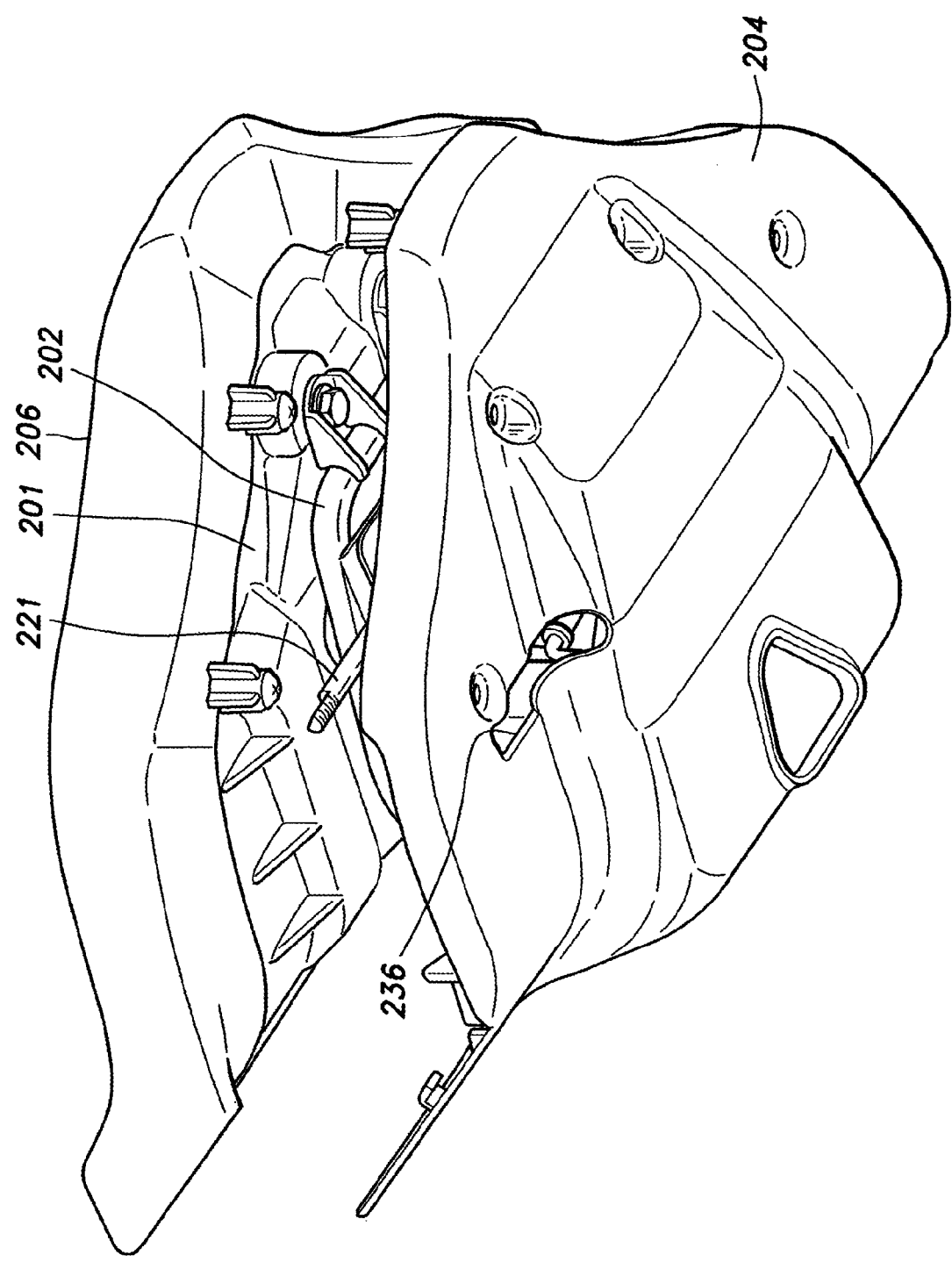
FIG. 15 is a partial exploded perspective view of the seat.

The seat lifting lever 198 is accommodated in the seat 200 except the operating piece 220 and a portion thereof on the right end side of the lever arm 221 to which the operating piece 220 is attached. When the seat lifting lever 198 is to be incorporated into the seat 200, the components except the operating piece 220 are assembled into the seat as shown in FIG. 15, and the seat 200 is assembled in a state in which the right end of the lever arm 221 extends from an opening (slit) 236 formed in the seat bottom cover 204. Then, in a state in which the entire seat 200 is assembled finally, the operating piece 220 can be fitted into the right end of the lever arm 221 and fixed by a hexagon cap nut 237. Consequently, the assembling performance is good.

The seat lifting lever 198 is provided in such a manner as to overlap with the lower side of the seat 200 as viewed in plan including part of the operating piece 220 and the lever arm 221 which project from the opening 236. Further, at least the operating piece 220 positioned on the outermost side from the seat lifting lever 198 is provided such that it is positioned on the outer side with respect to the outer shell 18 below the seat 200. Consequently, in the compact configuration wherein the occupant gets on the vehicle body (outer shell) in a posture in which it sandwiches the vehicle body with both legs, while the seat lifting lever 198 of the telescopic strut 180 can be accessed readily, unintended contact with the seat lifting lever 198 can be prevented.

(Supporting Structure for the Battery Pack)

As shown in FIGS. 1 and 3, a battery case 251 for supporting the battery pack 250 is supported on the shelf board 17. The battery case 251 includes a bottom plate 253 of a rectangular shape, a front side wall 254 and a pair of left and right side walls 255 erected uprightly on the front side and the opposite left and right sides of the bottom plate 253. The paired left and right side walls 255 extend upwardly farther than the front side wall 254, and the battery case 251 is formed in a box shape having an opening 257 (refer to FIG. 16) which continues from an upper portion of the front side to an overall region of an upper portion and a rear portion. It is to be noted that, in another embodiment, preferably the opening 257 is open at least upwardly, and the rear portion side face may be closed. The left and right side walls 255 are depressed to the front side at a rear edge of an intermediate portion thereof in the upward and downward direction to expand the opening 257. Consequently, the battery pack 250 supported by the battery case 251 is exposed at an intermediate portion of the side face rear portion side in the upward and downward direction.

A bracket 258 is coupled to the center post 44 such that it extends rearwardly, and the front side wall 254 of the battery case 251 is coupled at a front face thereof to the bracket 258. The outer shell 18 is disposed along an edge portion of the opening 257 such that the opening 257 of the battery case 251 is exposed to the outside.

The battery pack 250 is formed substantially in a vertically elongated parallelepiped. A locking protrusion 262 is provided in a projecting manner on an upper face of the bottom plate 253 of the battery case 251, and an accepting hole 263 is provided in a concave state on the bottom face of the battery pack 250 such that the locking protrusion 262 can be accepted in the accepting hole 263. The locking protrusion 262 projects into the accepting hole 263 to restrict sliding movement of the battery pack 250 in a direction along the face with respect to the bottom plate 253 while the battery pack 250 can be tilted rearwardly around the locking protrusion 262. In particular, by engagement between the accepting hole 263 and the locking protrusion 262, the battery pack 250 can pivot between a mounted position at which the front face thereof extends along the front side wall 254 and a removable position at which the front face thereof is inclined rearwardly with respect to the front side wall 254. At the mounted position, terminals (not shown) formed on the battery pack 250 and the battery case 251 contact with each other to allow power feeding from the battery pack 250. It is to be noted that, in other embodiments, the locking protrusion 262 may not be formed on the bottom plate 253 but may be formed on the front side wall 254.

Figure 16:
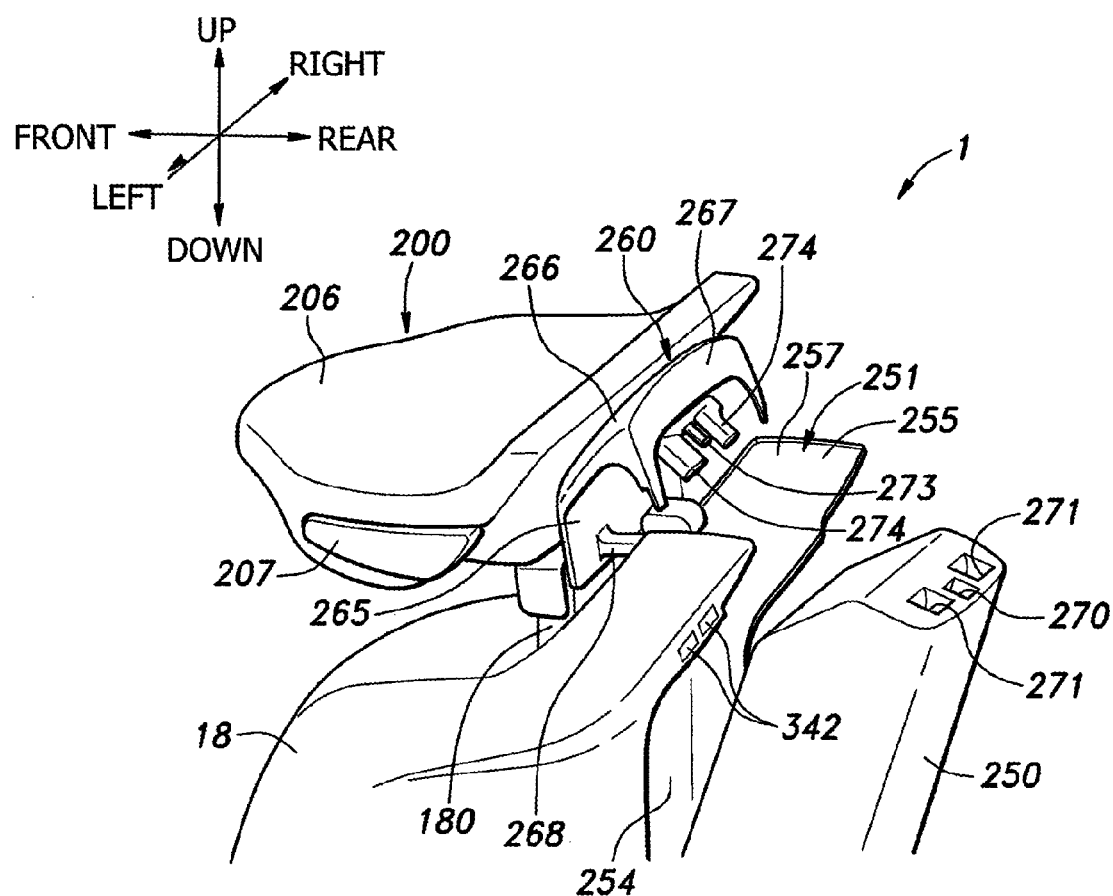
FIG. 16 is an upper side perspective view illustrating a state in which a lid of a battery case is open.

As shown in FIGS. 1 and 16, a lid 260 is supported for pivotal motion at an upper edge portion of the front side wall 254 and forms an upper wall of the battery case 251. The lid 260 includes a front plate 265 for closing up an opening formed at an upper portion of the front side wall 254, an upper plate 266 connected to an upper edge of the front plate 265 with an angle and configured to close up an opening formed between upper ends of the left and right side walls 255, and a rear plate 267 connected to a rear edge of the upper plate 266 with an angle. The lid 260 has a substantially channel-shaped cross section.

The lid 260 has a pair of left and right arms 268 provided in a projecting manner on a reverse face (rear face) of the front plate 265. A shaft 269 is supported at an upper portion of a rear face of the front side wall 254 such that it extends in the leftward and rightward direction. The lid 260 is supported at the arms 268 thereof for pivotal motion by the shaft 269 such that it is supported on an upper edge portion of the front side wall 254 for pivotal motion around the axial line extending in the leftward and rightward direction. The lid 260 can pivot between a closing position at which it closes an upper portion of the battery case 251 and an opening position to which the lid 260 is pivoted in the counterclockwise direction as viewed from the right side to the front side. A torsion coil spring (not shown) is interposed between the lid 260 and the front side wall 254 and supported by the shaft 269. Consequently, the lid 260 is biased to the opening position by the torsion coil spring. It is to be noted that the lid 260 can pivot only in a state in which the telescopic strut 180 stretches until the seat 200 is disposed at the upper position at which it does not interfere with the lid 260. When the telescopic strut 180 is contracted until the seat 200 is positioned at the lower position (seating position), the seat 200 abuts at a rear end face thereof with the front plate 265 of the lid 260 to restrict pivotal motion of the lid 260 from the closing position to the opening position. The lid 260 cooperates, at the closing position, with the outer shell 18 to smoothly form an outer face of the inverted pendulum type vehicle 1.

On an upper face of the battery pack 250, one latch hole 270 and a pair of left and right accepting holes 271 are formed such that the accepting holes 271 are disposed on the left and right of the latch hole 270. Meanwhile, on a reverse face of the upper plate 266 of the lid 260, one latch 273 and a pair of left and right projections 274 are provided in a projecting manner such that the projections 274 are disposed on the left and right of the latch 273. By disposing the battery pack 250 at the mounted position and disposing the lid 260 at the closing position, the paired left and right projections 274 plunge into the paired left and right accepting holes 271, and the latch 273 plunges into the latch hole 270. The latch 273 and the latch hole 270 are formed in a known push-push mechanism such that, if the latch 273 is pushed once into the latch hole 270, then the latch 273 is locked by the latch hole 270, and then if the latch 273 is pushed into the latch hole 270 again in the state in which the latch 273 is locked by the latch hole 270, the locking of the latch 273 by the latch hole 270 is canceled. As the latch 273 is engaged with the latch hole 270 and the projections 274 are engaged with the accepting holes 271, the lid 260 is held at the closed position and the battery pack 250 is held at the mounted position.

When the battery pack 250 is to be mounted on the battery case 251, the telescopic strut 180 is stretched first to dispose the seat 200 to the upper position. Consequently, since the lid 260 is permitted to pivot to the opening position, the lid 260 is disposed to the opening position. Then, the battery pack 250 is tilted to approach from the rear of the battery case 251 so that the lower end portion thereof comes to the front side, whereupon the locking protrusion 262 of the battery case 251 is projected into the receiving hole of the battery pack 250 to dispose the battery pack 250 to the removable position. Then, the battery pack 250 is pivoted around the locking protrusion 262 with respect to the battery case 251 to dispose the battery pack 250 to the mounted position. Then, the lid 260 is pivoted to the closing position to place the latch 273 and the latch hole 270 and place the projections 274 and the accepting holes 271 into engagement with each other. Consequently, the battery pack 250 is mounted on the battery case 251. Then, the telescopic strut 180 is contracted to dispose the seat 200 at the lower position thereby to restrict pivotal motion of the lid 260. Consequently, the lid 260 is pushed in downwardly, and since the lid 260 cannot pivot even if the engagement between the latch 273 and the latch hole 270 is canceled, the battery pack 250 is maintained in the state in which it is supported between the battery case 251 and the lid 260. When the battery pack 250 is to be removed from the battery case 251, the telescopic strut 180 is stretched to dispose the seat 200 to the upper position to permit pivotal motion of the lid 260 to the open position.

(Electrical Unit)

As shown in FIG. 1, the electrical unit 300 includes a main wheel controlling power drive unit 301 (hereinafter referred to as main wheel PDU) for controlling the left and right driving units 90 and 130, and a tail wheel controlling power drive unit 302 (hereinafter referred to as tail wheel PDU) for controlling the tail wheel unit 80. The electrical unit 300 further includes a DC-DC converter 304 (hereinafter referred to as converter) for stepping down a dc voltage supplied from the battery pack to a predetermined dc voltage, and an I/O interface unit 305 (hereinafter referred to as I/O unit) for transferring a signal to and from various sensors. The electrical unit 300 further includes a switch unit 306 for operating on/off of a power supply, and a gyro sensor 308 for detecting an inclination angle and an angular speed of the vehicle body frame 10 (inverted pendulum type vehicle 1) with respect to a predetermined axial line (for example, a vertical line). To the I/O unit 305, signals from a seating sensor 307 incorporated in the seat unit 170, the gyro sensor 308 and the switch unit 306 are inputted.

As shown in FIG. 1, in the vehicle body frame 10, the front edge portion 12A of the traveling unit supporting section 12 is disposed most forwardly as viewed in side elevation. Since the front end of the driving unit supporting section 14 is formed from the first pipe 14A and the second pipe 14B which are inclined rearwardly toward the upper side from the front edge portion 12A, it is displaced rearwardly from the front edge portion 12A. The front end, on the outer periphery of the main wheel 52, of the traveling unit 50 disposed below the traveling unit supporting section 12 projects forwardly farther than the front edge portion 12A. In order to include the vehicle body frame 10 and the traveling unit 50, the front face portion of the outer shell 18 is formed in a curved face which extends smoothly from the front side upper end of the driving unit supporting section 14 to the outer peripheral front end of the main wheel 52. Consequently, on the front side of the vehicle body frame 10, a space 315 is formed between the front side of the vehicle body frame 10 and the front face portion of the outer shell 18. Particularly, the space 315 is formed such that it extends from the front side of the first pipe 14A and the second pipe 14B of the driving unit supporting section 14 to the front side of the traveling unit supporting section 12. The electrical unit 300 is disposed in the space 315.

The main wheel PDU 301 and the tail wheel PDU 302 include a microcomputer configured from a CPU, a memory and so forth, and a switching circuit for controlling current or voltage to be supplied to the electric motors 84, 92 and 132. To the main wheel PDU 301 and the tail wheel PDU 302, signals from the seating sensor 307, gyro sensor 308 and switch unit 306 are inputted through the I/O unit 305. The main wheel PDU 301 controls the electric motors 92 and 132 in response to signals from the seating sensor 307 and the gyro sensor 308 based on inverted pendulum control set in advance. The tail wheel PDU 302 controls the electric motor 84 in response to signals from the seating sensor 307 and the gyro sensor 308 based on a turning control rule set in advance.

As shown in FIGS. 1 and 3, the main wheel PDU 301 and the tail wheel PDU 302 are supported on the same face of a first board 320 of a rectangular shape. The main wheel PDU 301 is supported on one side of the first board 320 in the longitudinal direction while the tail wheel PDU 302 is supported on the other side. Further, a fan 321 is provided at the end portion of the first board 320 at which the main wheel PDU 301 is disposed. In the present embodiment, the fan 321 is a known axial flow fan having a frame body of a rectangular shape and rotary wings supported for rotation in the frame body. The fan 321 is disposed on the first board 320 such that the axial line of rotation thereof extends in parallel to the longitudinal direction of the first board 320. The main wheel PDU 301 is greater than the tail wheel PDU 302, and the thickness thereof from the first board 320 is greater.

As shown in FIG. 4, a bracket 322 is mounted at the front edge portion 12A of the traveling unit supporting section 12 and a front end portion of the left and right paired side portions 12C. The bracket 322 has an inclined face which advances upwardly toward the rear and has a front end extending forwardly farther than the front edge portion 12A. Further, a pair of fastening pieces 323 are coupled to lower end portions of the first pipe 14A and the second pipe 14B of the driving unit supporting section 14 and project in a forward direction and in directions in which they approach each other. The first board 320 is fastened to a front end of the bracket 322 and the fastening pieces 323 by screws, bolts or the like. The first board 320 is disposed extending forwardly and backwardly such that the tail wheel PDU 302 is disposed on the front side while the main wheel PDU 301 is disposed on the rear side. The first board 320 is further disposed in an inclined relationship such that it advances upwardly toward the rear. The first board 320 is disposed such that a front end portion thereof is displaced rearwardly with respect to a front end portion of the bracket 322. The front end portion of the bracket 322 extends forwardly farther than the first board 320 and the tail wheel PDU 302 supported on the first board 320.

As shown in FIGS. 1 and 3, the converter 304, I/O unit 305 and switch unit 306 are supported on the same face of a second board 325 of the rectangular shape. The converter 304 is supported on one side of the second board 325 in the longitudinal direction, and the I/O unit 305 and the switch unit 306 are supported in a juxtaposed relationship with each other on the other side of the second board 325. The converter 304 is greater than the I/O unit 305 and is greater in thickness from the second board 325. A pair of fastening pieces 326 are coupled to an intermediate portion of an upwardly and downwardly extending portion of the first pipe 14A and the second pipe 14B of the driving unit supporting section 14 and project in directions in which they approach each other. The second board 325 is fastened to the front side of the fastening pieces 326 and the connection plate 14H by screws, bolts or the like. The second board 325 has a face directed forwardly and backwardly and disposed extending upwardly and downwardly. The converter 304 is disposed at a lower portion of the front face of the second board 325, and the I/O unit 305 is disposed on an upper left portion of the front face while the switch unit 306 is disposed at an upper right portion of the front face.

The switch unit 306 has a switch button 328 which extends forwardly, passes through an opening formed in the front face portion of the outer shell 18 and is exposed outwardly. An outer face of the switch button 328 which is a pushing operation face has a display device 329 which is directed obliquely upwardly similarly to the outer face of the outer shell 18 and emits light in response to an on or off state of the switch. The display device 329 may be, for example, an LED. It is to be noted that, in another embodiment, the display device 329 may indicate a state of the inverted pendulum type vehicle (for example, presence or absence of a failure, a battery remaining capacity or the like) in the form of a turning on interval or an emitted light color.

As shown in FIGS. 1 and 2, a first cover 335 is coupled to the front face side of the first board 320 in such a manner as to cover the tail wheel PDU 302, main wheel PDU 301 and fan 321. The first cover 335 has a front opening 336 at a front end portion thereof and has a rear opening (not shown), which defines an outer periphery of the fan 321, at a rear end portion thereof. In other words, the main wheel PDU 301 and the tail wheel PDU 302 are disposed in a space defined by the first board 320 and the first cover 335, and the defined space allows communication of air through the front opening 336 and the fan 321. The outer shell 18 preferably has a vent for communicating the outside and the inside with each other at a portion thereof which is positioned forwardly of the front opening 336 of the first cover 335.

A second cover 338 is coupled to the front face side of the second board 325 in such a manner as to cover the converter 304, the I/O unit 305 and the switch unit 306. The second cover 338 is coupled at a lower end portion thereof to the outer face of a rear end portion of the first cover 335 and communicates with the inside of the first cover 335 through the fan 321. The second cover 338 has an upper opening 339 at an upper end portion thereof. In other words, the converter 304, the I/O unit 305 and the switch unit 306 are disposed in a space defined by the second board 325 and the second cover 338, and the defined space allows communication of air through the fan 321 and the upper opening 339. It is to be noted that the switch button 328 of the switch unit 306 extends through the second cover 338 and projects to the front face portion of the outer shell 18.

By the configuration described above, if the fan 321 rotates, then air at a lower portion in the outer shell 18 is taken in from the front opening 336 of the first cover 335, passes in order through the inside of the first cover 335, the fan 321 and the inside of the second cover 338 and is discharged from the upper opening 339 of the second cover 338. When the air passes the inside of the first cover 335 and the second cover 338, it exchanges heat with the tail wheel PDU 302, main wheel PDU 301, converter 304, I/O unit 305 and switch unit 306 to cool them. The path defined by the first cover 335 and the second cover 338 extends in the upward and downward direction while it is inclined. Since air is taken from the front opening 336 disposed on the lower end side and discharged from the upper opening 339 disposed on the upper end side, the air heated by heat exchange in the first cover 335 and the second cover 338 flows easily.

The air discharged from the upper opening 339 of the second cover 338 is introduced rearwardly in the outer shell 18 along the inner face of the upper wall of the outer shell 18 and is discharged to the outside of the outer shell 18 from an outlet 342 (refer to FIG. 16) formed at an upper end of a rear face portion of the outer shell 18. Therefore, the high temperature air having passed through the inside of the first cover 335 and the inside of the second cover 338 does not hit upon the occupant. It is to be noted that a vent pipe for communicating the upper opening 339 and the outlet 342 with each other may be provided in the outer shell 18.

The gyro sensor 308 is supported on a bracket 345 (refer to FIG. 4) mounted between front end portions of the paired left and right third pipes 14C and is disposed between the lower end portions of the first pipe 14A and the second pipe 14B as shown in FIG. 1. More particularly, the gyro sensor 308 is disposed between the first board 320 and the right side driving unit 130 in the forward and backward direction and disposed between the second board 325 and the main wheel 52 in the upward and downward direction.

While, in the electrical unit 300 configured in such a manner as described above, the front edge of the first cover 335 is disposed on the most front side in the electrical unit 300, as shown in FIG. 1, the front edge of the first cover 335 is disposed on the rear side with respect to a vertical line L2 (tangential line) which passes the front edge of the main wheel 52 (particularly, the front edge of the driven roller 64 disposed on the most front side) which configures the front edge of the traveling unit 50. Further, the tail wheel PDU 302, main wheel PDU 301, converter 304, I/O unit 305, switch unit 306, first cover 335 and second cover 338 are disposed rearwardly with respect to a virtual line L3 which passes the front edge of the seat 200 (particularly, the front edge of the seat main body 206) and the front edge of the bracket 322. By such a configuration as just described, if a comparatively large object collides with the front side portion of the inverted pendulum type vehicle 1, then since the object collides with the front edge of the seat 200 or the front edge of the bracket 322, collision thereof with the electrical unit 300 can be avoided.

In the present embodiment, the vehicle body frame 10 which supports the left and right driving units 90 and 130 which have a smaller width in the forward and rearward direction than that of the main wheel 52 is provided above the traveling unit 50 including the main wheel 52, Further, the electrical unit 300 is provided in the space 315 which is a dead space formed by providing the outer shell 18 which smoothly covers the upper front edge of the vehicle body frame 10 to the front edge of the main wheel 52. Consequently, compactification of the entire inverted pendulum type vehicle 1 can be anticipated. Further, since the switch button 328 of the switch unit 306 and the display device 329 are provided on the front side face of the outer shell 18, confirmation of the display device and operation of the switch button 328 by the occupant seated on the seat 200 can be facilitated. Further, it is possible to make hard an operation of the switch button 328 by a third party other than the occupant.

Figure 17:
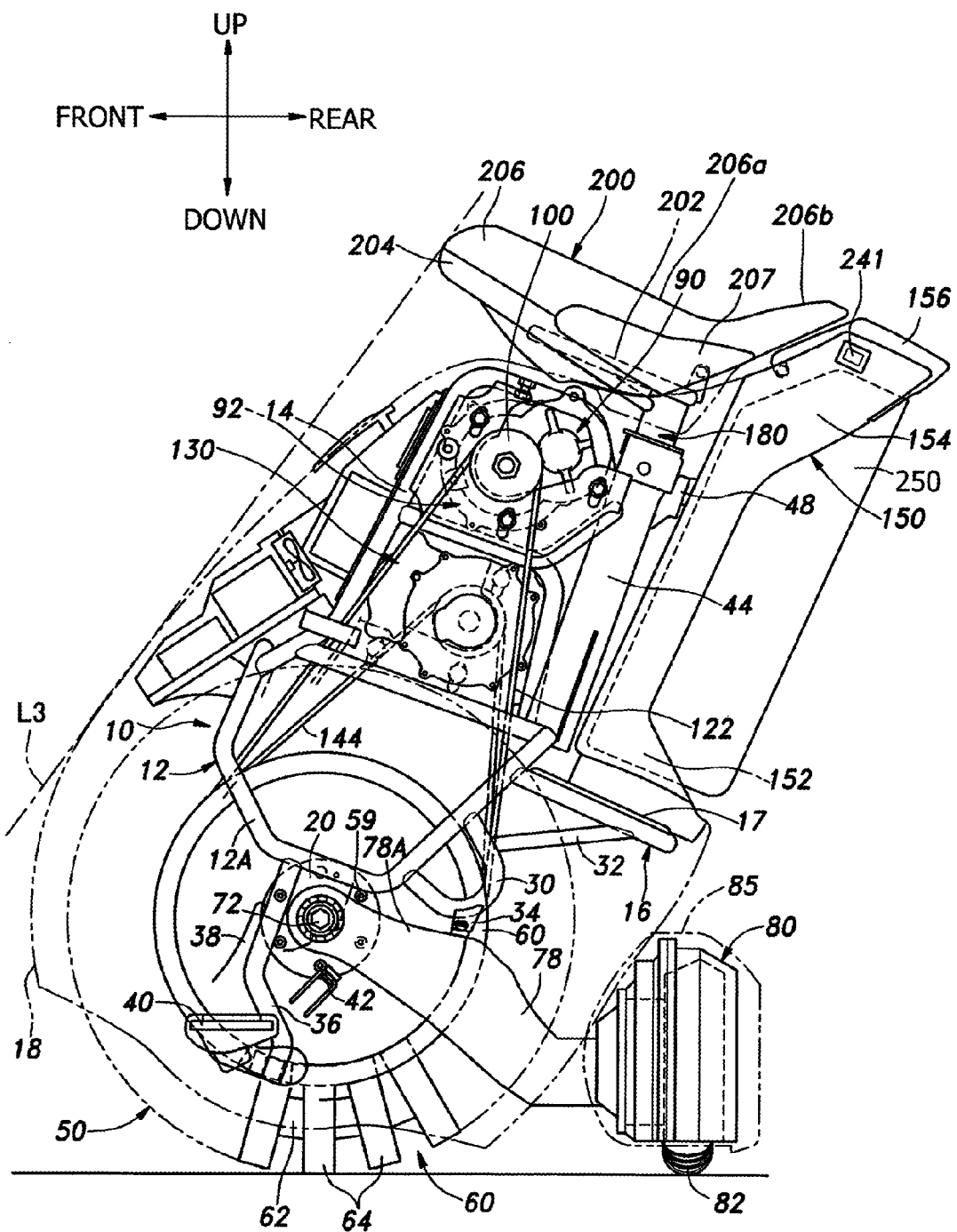
FIG. 17 is a side elevational view of the inverted pendulum type vehicle in a rearwardly inclined state.

Now, a configuration and operation of the inverted pendulum type vehicle on which an occupant is to get on is described with reference to FIG. 17. When an occupant intends to get on the inverted pendulum type vehicle (namely, to be seated on the seat 200), the occupant would operate a getting-on button 241 (refer to FIG. 17) provided at a position at which the occupant can easily access the getting-on button 241 from the rear of the inverted pendulum type vehicle 1 which is in such a self-standing state (namely, after starting up) as shown in FIG. 1 to temporarily stop the inverted pendulum control. Consequently, as shown in FIG. 17, the vehicle (more particularly, the vehicle body frame 10, driving unit supported at the upper portion of the frame 10 and so forth) pivots rearwardly by the self-weight around the hollow axle 54 (refer to FIG. 2). Thereafter, the rear side limit stopper 34 provided on the vehicle body frame 10 stops at a position at which it contacts with the upper face of the tail wheel arm 78 to place the vehicle into a rearwardly inclined state. At this time, also the seat 200 pivots rearwardly from the driving position shown in FIG. 1 together with the vehicle body frame 10 to move to a lower getting-on starting position (rearward standby position) shown in FIG. 17. Consequently, since the seat face position of the seat 200 becomes lower, the occupant can be easily seated even from the rear of the vehicle body. The occupant seated on the vehicle can operate the getting-on button 241 again to start the inverted pendulum control. The starting of the inverted pendulum control may be executed when predetermined time elapses after the seating sensor 307 detects seating of the occupant irrespective of operation of the getting-on button 241.

Here, as shown in FIG. 1, the seat main body 206 has a seat face main portion 206a including the seat face from the front edge to a central portion in the substantially horizontal direction as viewed in side elevation and a seat face rear portion 206b inclined obliquely rearwardly upwardly from the rear edge of the seat face main portion 206a. In this manner, since the seat 200 has the inclined seat face rear portion 206b, the hip of the occupant can be supported in stability. On the other hand, when the occupant is seated on the seat 200, since the seat face rear portion 206*b* inclines to an approximately horizontal direction as shown in FIG. 17, the occupant can get on the vehicle more easily from the rear of the vehicle body at the rear standby position. Further, in the base member 201 which supports the lower side of the seat main body 206, a main portion 201*a* is formed in a substantially flat shape and a rear portion 201*b* is inclined obliquely rearwardly upwardly as shown in FIG. 11 similarly to the seat face of the seat main body 206. Consequently, the load on the seat face can be dispersed favorably while permitting deformation of the seat main body 206 by the load of the occupant.

Figure 18:
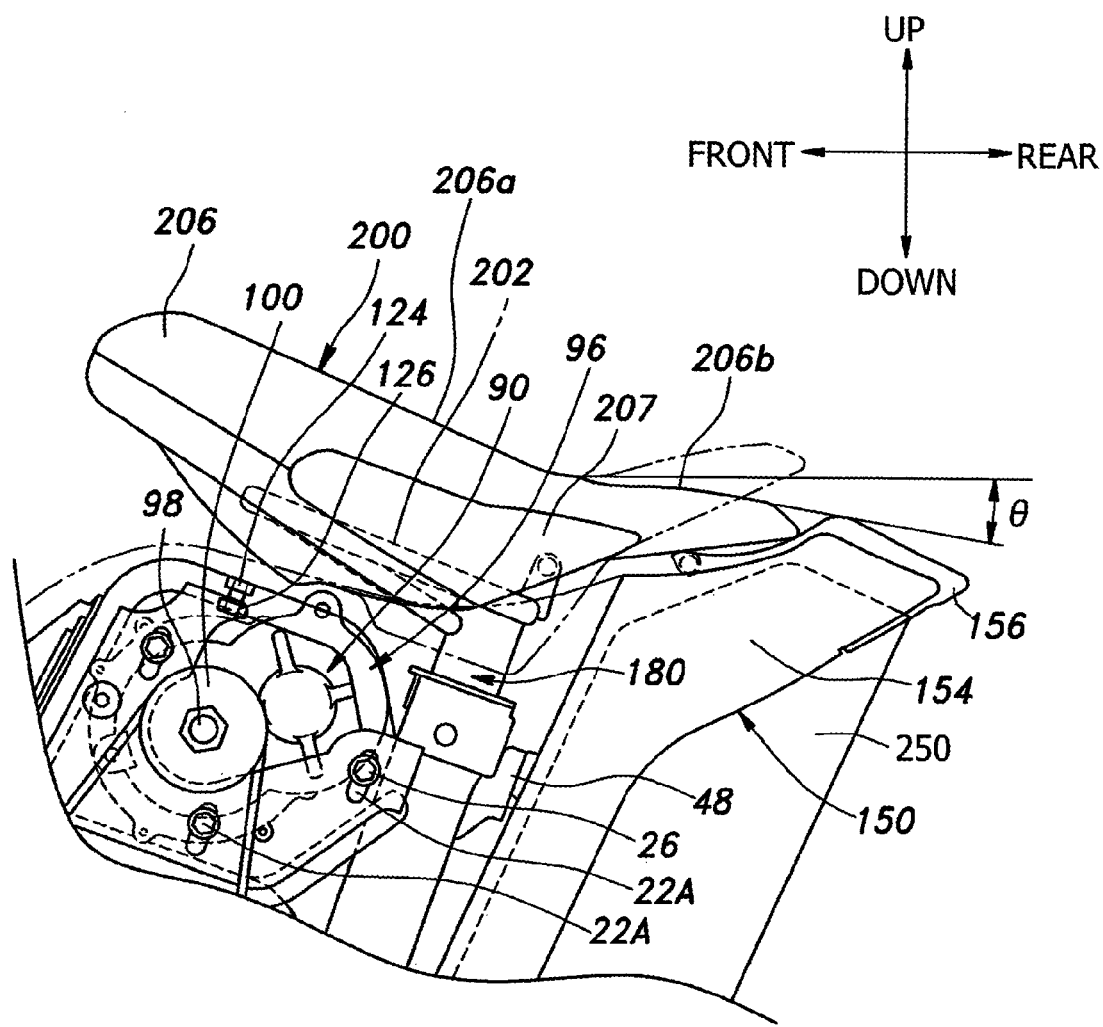
FIG. 18 is a partial side elevational view showing a modification to the seat.

It is to be noted that, when the seat 200 is placed into a rearwardly inclined state, as shown in the modification of FIG. 18, the seat face angle may be set such that the seat face rear portion 206*b* is placed into an inclined state same as or lower than the horizontal direction as viewed in side elevation (here, the seat face rear portion 206*b* is inclined obliquely rearwardly downwardly by a predetermined angle θ with respect to the horizontal direction). Consequently, facilitation in seating by the occupant can be enhanced further.

(Posture and Driving Control of the Inverted Pendulum Type Vehicle)

Traveling operation of the inverted pendulum type vehicle 1 is described. The main wheel PDU 301 carries out arithmetic operation at any time regarding a gravity center position of the entire inverted pendulum type vehicle 1 including the occupant who is seated on the seat main body 206 from variations of the inclination angle and the angular velocity in the forward or rearward and leftward or rightward directions of the vehicle body frame 10 measured by the gyro sensor 308.

When the gravity center of the entire inverted pendulum type vehicle 1 including the occupant is positioned at a neutral position (for example, a position just above the center of the telescopic strut 180), the main wheel PDU 301 drives the electric motors 92 and 132 of the left and right driving units 90 and 130 based on a control process in accordance with the inverted pendulum controlling rule to maintain the vehicle body in an uprightly standing posture.

At this time, the tail wheel PDU 302 maintains the electric motor 84 of the tail wheel unit 80 in a stopping state based on the control process in accordance with the revolution controlling rule and the tail wheel 82 does not rotate.

If the gravity center of the entire inverted pendulum type vehicle 1 including the occupant moves to the front side with respect to the neutral position, then, the main wheel PDU 301 drives the electric motors 92 and 132 of the left and right driving units 90 and 130 in a forward rotational direction at the same speed based on the control process in accordance with the inverted pendulum controlling rule. The left and right driving disks 58 rotate forwardly at the same speed in accordance with the driving of the electric motors 92 and 132, and the main wheel 52 rotates forwardly around the wheel center thereof, namely, revolves in the forward direction. At this time, since a rotational speed difference does not occur between the left and right driving disks 58, the driving rollers 66 of the driving disk 58 and the driven rollers 64 of the main wheel 52 do not rotate and the inverted pendulum type vehicle 1 moves straightly forwardly.

If the gravity center of the entire inverted pendulum type vehicle 1 including the occupant moves to the rear side with respect to the neutral position, then the main wheel PDU 301 drives the electric motors 92 and 132 of the left and right driving units 90 and 130 in the reverse rotational direction at the same speed based on the control process in accordance with the inverted pendulum controlling rule. The left and right driving disks 58 rotate reversely at the same speed in accordance with the driving of the electric motors 92 and 132, and the main wheel 52 rotates reversely around the wheel center thereof, namely, revolves in the rearward direction. At this time, since a rotational speed difference does not occur between the left and right driving disks 58, the driving rollers 66 of the driving disks 58 and the driven rollers 64 of the main wheel 52 do not rotate and the inverted pendulum type vehicle 1 moves straightly backwardly.

Upon forward movement and backward movement, the tail wheel PDU 302 carries out the control process in accordance with the revolution controlling rule to maintain the stopping state of the electric motor 84 of the tail wheel unit 80, and consequently, the tail wheel 82 does not revolve. However, the free rollers of the tail wheel 82 rotate together with the forward movement of the inverted pendulum type vehicle 1.

If the gravity center of the entire inverted pendulum type vehicle 1 including the occupant moves to the left side or the right side with respect to the neutral position, then, the main wheel PDU 301 drives the electric motors 92 and 132 of the left and right driving units 90 and 130 in rotational directions and/or at rotational speeds different from each other based on the control process in accordance with the inverted pendulum controlling rule. By the driving of the electric motors 92 and 132, a rotational speed difference occurs between the left and right driving disks 58. Consequently, a component of force in a direction orthogonal to force in a circumferential (tangential) direction by the rotating force of the left and right driving disks 58 acts upon contacting faces of the left and right driving rollers 66 and the driven rollers 64 of the main wheel 52. By the component of force, the driven rollers 64 rotate (revolve) around the central axial line thereof.

The rotation of the driven rollers 64 is determined by the rotational speed difference between the left and right driving disks 58. For example, if the left and right driving disks 58 are rotated in reverse directions different from each other at the same speed, then the main wheel 52 does not revolve at all but rotation of the driven rollers 64 occurs. Consequently, the driving force in the leftward or rightward direction is applied to the main wheel 52 and the inverted pendulum type vehicle 1 moves (moves abeam) in the leftward or rightward direction. Further, if the left and right driving disks 58 are rotated at speeds different from each other in the same direction, then rotation of the driven rollers 64 occurs together with the revolution of the main wheel 52. Consequently, the inverted pendulum type vehicle 1 moves obliquely forwardly or obliquely rearwardly.

At this time, the tail wheel PDU 302 may drive the electric motor 84 of the tail wheel unit 80 so that the tail wheel 82 rotates (revolves) at a rotational speed equal to a moving speed in an abeam direction based on the control process in accordance with the revolution controlling rule. If a difference occurs between the movement amount by rotation of the driven rollers 64 of the main wheel 52 and the movement amount by rotation of the tail wheel 82, then the inverted pendulum type vehicle 1 turns.

While the present invention has been described in connection with a number of illustrative embodiments thereof, as can be easily understood by a person skilled in the art, the present invention is not limited to such an embodiment as described above but can be suitably altered without departing from the scope of the present invention. For example, the main wheel 52 may be configured such that a plural number of driven rollers 64 are combined so as to form a ring shape in which they can rotate independent of each other. The supporting member for the driven rollers 64 by such a combination as just described is not limited to the circular ring member 62, but may be implemented by a disk-shaped member having a plurality of supporting portions for the driven rollers 64 on the outer periphery thereof. Further, the tail wheel 82 is not limited to an omnidirectional wheel but may be implemented by a main wheel using a normal rubber tire. The projecting portion 102A of the reduction gear 96 of the left side driving unit 90 may project to the vehicle body rear side with respect to the position of the central axial line of the electric motor 92 reversely to the projecting direction of the projecting portion 142A of the reduction gear 136 of the right side driving unit 130. The left side driving unit attachment plate 22 and the right side driving unit attachment plate 24 may have openings (through-holes) through which the reduction gear output power shafts 98 and 138 can penetrate in place of the cutaway portions 22B and 24B.

Figure 19:
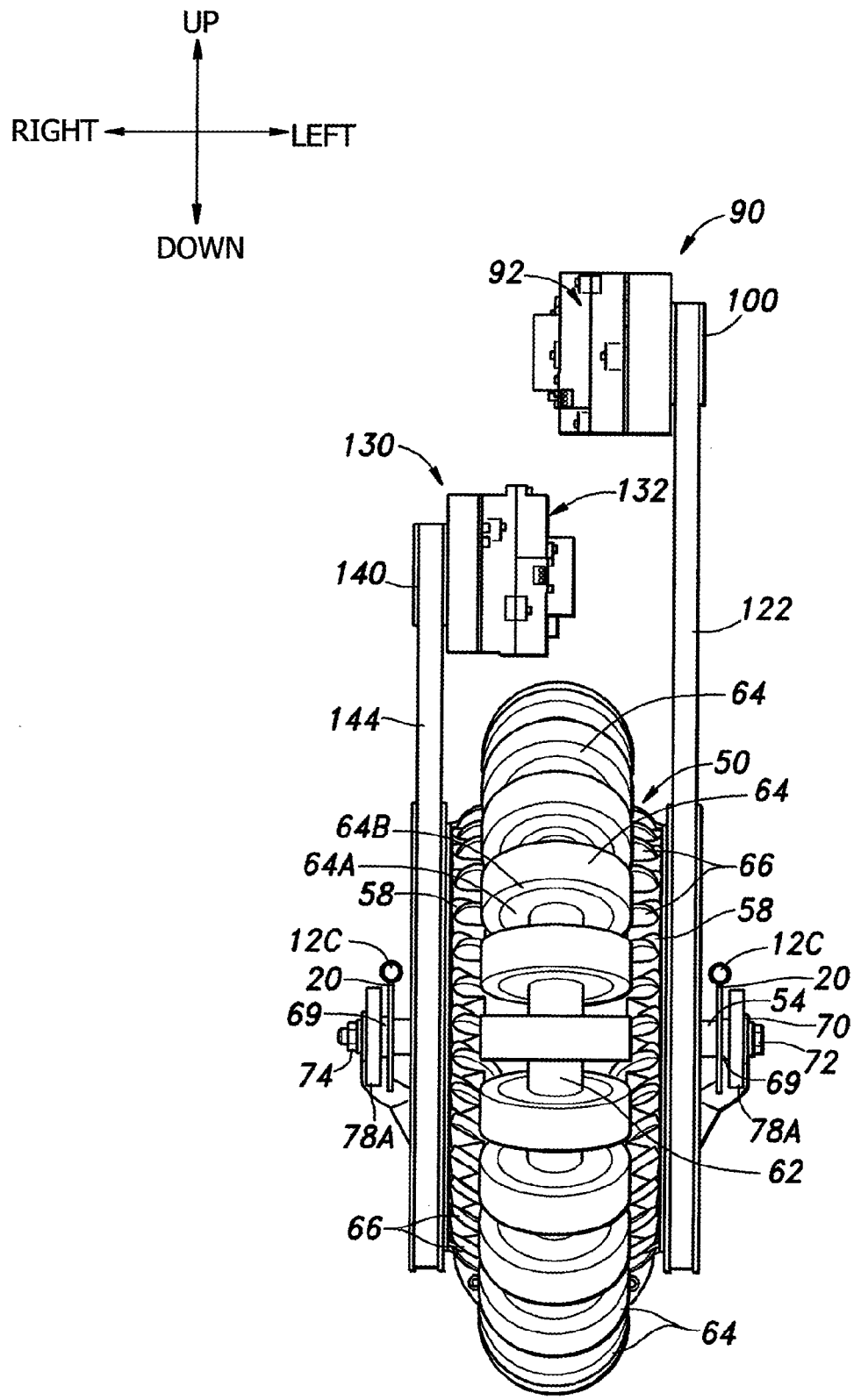
FIG. 19 is a front elevational view selectively showing a traveling unit and a driving unit of an inverted pendulum type vehicle according to another embodiment.

Further, the components in the embodiments described above are not necessarily essentially required components, but can be suitably chosen and selected without departing from the scope of the present invention. The reduction gear is not essentially required but may be omitted, but the left and right driving pulleys 100 and 140 may be directly driven by the left and right electric motors 92 and 132 as shown in FIG. 19. Also the tail wheel unit 80 may be omitted.

DESCRIPTION OF REFERENCE SYMBOLS

1 . . . Inverted pendulum type vehicle, 10 . . . Vehicle body frame, 12 . . . Traveling unit supporting section, 14 . . . Driving unit supporting section, 16 . . . Battery supporting section, 18 . . . Outer shell, 22 . . . Left side driving unit attachment plate, 22A . . . Bolt penetrating hole, 22B . . . Cutaway portion, 24 . . . Right side driving unit attachment plate, 24A . . . Bolt penetrating hole, 24B . . . Cutaway portion, 26 . . . Attachment bolt, 28 . . . Mounting bolt, 40 . . . Step, 42 . . . Front side limit stopper, 44 . . . Center post, 46 . . . Gusset, 47 . . . Cylindrical bush, 50 . . . Traveling unit, 52 . . . Main wheel, 54 . . . Hollow axle, 54A . . . Positioning stepped portion, 55 . . . Central through-hole, 56 . . . Ball bearing, 58 . . . Driving disk, 60 . . . Driven pulley, 62 . . . Circular ring member, 64 . . . Driven roller, 66 . . . Driving roller, 68 . . . Nut, 68A . . . Ring-shaped protrusion, 72 . . . Headed bolt, 74 . . . Nut, 78 . . . Tail wheel arm, 80 . . . Tail wheel unit, 82 . . . Tail wheel, 84 . . . Electric motor, 85 . . . Outer shell, 90 . . . Left side driving unit, 92 . . . Electric motor, 94 . . . Output power shaft (motor output power shaft), 96 . . . Reduction gear, 98 . . . Output power shaft (reduction gear output power shaft), 100 . . . Driving pulley, 102 . . . Gear box, 102A . . . Projecting portion, 122 . . . Cog belt, 124 . . . Adjustment bolt, 126 . . . Lock nut, 130 . . . Right side driving unit, 132 . . . Electric motor, 136 . . . Reduction gear, 138 . . . Output power shaft (reduction gear output power shaft), 140 . . . Driving pulley, 142 . . . Gear box, 142A . . . Projecting portion, 144 . . . Cog belt, 146 . . . Adjustment bolt, 148 . . . Lock nut, 170 . . . Seat unit, 180 . . . Telescopic strut, 181 . . . Unlocking button, 182 . . . Piston rod, 184 . . . Cylinder tube, 198 . . . Seat lifting lever, 200 . . . Seat, 201 . . . Base member, 202 . . . Seat frame, 204 . . . Seat bottom cover, 206 . . . Seat main body, 206a . . . Seat face main portion, 206b . . . Seat face rear portion, 207 . . . Side guard member, 211 . . . Main frame, 212 . . . Sub frame, 221 . . . Lever arm, 222 . . . Operation arm, 222a . . . Engaging portion, 234 . . . Pushdown rod, 235 . . . Pivotal motion restricting pin, 236 . . . Opening, 241 . . . Getting-on button, 250 . . . Battery pack, 251 . . . Battery case, 254 . . . Front side wall, 257 . . . Opening, 260 . . . Lid, 262 . . . Locking protrusion, 263 . . . Accepting hole, 268 . . . Arm, 270 . . . Latch hole, 273 . . . Latch, 300 . . . Electrical unit, 301 . . . Main wheel controlling power drive unit, 302 . . . Tail wheel controlling power drive unit, 304 . . . DC-DC converter, 305 . . . I/O interface unit, 306 . . . Switch unit, 308 . . . Gyro sensor, 320 . . . First board, 321 . . . Fan, 325 . . . Second board, 328 . . . Switch button, 329 . . . Display device, 335 . . . First cover, 338 . . . Second cover

We claim:

1. An inverted pendulum vehicle comprising:
a vehicle body frame;
a main wheel formed by combining a plurality of rotatable driven rollers such that axial lines of rotation of the driven rollers form a ring;
left and right driving disks supported for rotation on the vehicle body frame in such a manner as to be positioned on opposite left and right sides of the vehicle body frame in a substantially coaxial relationship with an axial line of rotation of the main wheel, each of the left and right driving disks including a plurality of rotatable driving rollers disposed for contact in a twisted relationship with the driven rollers;
left and right driven pulleys provided coaxially on outer sides of the respective left and right driving disks;
left and right driving units attached to the vehicle body frame above the main wheel and having respective output power shafts to which respective left and right driving pulleys are attached; and
left and right endless transmission members extending between and around mutually corresponding left and right driving pulleys and driven pulleys,
wherein the inverted pendulum vehicle has an adjustable attachment mechanism for attaching the left and right driving units to the vehicle body frame, such that positions of the left and right driving units in an upward and downward direction can be adjustably changed.

2. The inverted pendulum vehicle according to claim 1, wherein each of the driving units comprises an electric motor and a reduction gear disposed between the electric motor and a corresponding one of the output power shafts.

3. The inverted pendulum vehicle according to claim 2, wherein the left and right driving units are disposed in an upwardly and downwardly offset relationship relative to each other and wherein the electric motor and corresponding reduction gear of each of the driving units are displaced in a vehicle widthwise direction relative to a vertical center line of the inverted pendulum vehicle such that the electric motor and corresponding reduction gear of each of the driving units are disposed on opposite sides of the vertical center line relative to each other, and the electric motor of one of the driving units disposed to be upwardly offset relative to the other of the driving units is positioned above the reduction gear of the other of the driving units, and the reduction gear of the one of the driving units is positioned above the electric motor of the other of the driving units.

4. The inverted pendulum vehicle according to claim 3, wherein each of the reduction gears of the left and right driving units comprises a projecting portion that projects sideways with respect to a center axial line of a corresponding one of the electric motors, and the projecting portions of the reduction gears project in different directions from each other.

5. The inverted pendulum vehicle according to claim 3, wherein the vehicle body frame has a pair of left and right attachment plates on the opposite left and right sides of the vehicle body frame, each of the attachment plates having an opening formed therein through which the output power shaft of the corresponding one of the left and right driving units extends.

6. The inverted pendulum vehicle according to claim 2, wherein each of the reduction gears of the left and right driving units comprises a projecting portion that projects sideways with respect to a center axial line of a corresponding one of the electric motors, and the projecting portions of the reduction gears project in different directions from each other.

7. The inverted pendulum vehicle according to claim 6, wherein the vehicle body frame has a pair of left and right attachment plates on the opposite left and right sides of the vehicle body frame, each of the attachment plates having an opening formed therein through which the output power shaft of the corresponding one of the left and right driving units extends.

8. The inverted pendulum vehicle according to claim 2, wherein the vehicle body frame has a pair of left and right attachment plates on the opposite left and right sides of the vehicle body frame, each of the attachment plates having an opening formed therein through which the output power shaft of the corresponding one of the left and right driving units extends.

9. The inverted pendulum vehicle according to claim 1, wherein the left and right driving units are disposed in an upwardly and downwardly offset relationship relative to each other, and wherein the left and right driving units overlap at least partially with each other as viewed in a top plan view of the inverted pendulum vehicle.

10. The inverted pendulum vehicle according to claim 9, wherein each of the driving units comprises an electric motor and a reduction gear disposed between the electric motor and a corresponding one of the output power shafts.

11. The inverted pendulum vehicle according to claim 9, wherein the vehicle body frame has a pair of left and right attachment plates on the opposite left and right sides of the vehicle body frame, each of the attachment plates having an opening formed therein through which the output power shaft of the corresponding one of the left and right driving units extends.

12. The inverted pendulum vehicle according to claim 1, wherein the inverted pendulum vehicle has adjustment bolts rotatably attached to the vehicle body frame and screwed with upper portions of the corresponding driving units, and the driving units are movable in the upward and downward direction with respect to the vehicle body frame by adjustment of the adjustment bolts.

13. The inverted pendulum vehicle according to claim 12, wherein the left and right driving units are disposed in an offset relationship from each other in the upward and downward direction, and wherein an upper frame portion of the vehicle body frame, to which a lower one of the driving units is attached, is positioned below an upper one of the driving units, such that a space for receiving a tool for rotating the adjustment bolt for adjusting the position of the lower one of the driving units is maintained between the upper frame and a bottom portion of the upper one of the driving units.

14. The inverted pendulum vehicle according to claim 1, wherein the vehicle body frame has a pair of left and right attachment plates on the opposite left and right sides of the vehicle body frame, each of the attachment plates having an opening formed therein through which the output power shaft of the corresponding one of the left and right driving units extends.

15. The inverted pendulum vehicle according to claim 1, wherein attachment plates are attached to the vehicle body frame at side portions of the vehicle body frame, and bolt penetrating holes, each elongated in the upward and downward direction, are formed in the attachment plates, respectively, and the driving units are fixed to the vehicle body frame by mounting bolts which extend through the bolt penetrating holes of the respective attachment plates and are held in threaded engagement with the respective driving units.

16. The inverted pendulum vehicle according to claim 15, wherein openings through which the output power shafts extend are formed in the attachment plates, respectively, and portions of the driving units which are disposed proximate to the respective output power shafts are fixed to the respective attachment plates.

17. The inverted pendulum vehicle according to claim 15, wherein the attachment plate corresponding to the left driving unit and the attachment plate corresponding to the right driving unit are respectively attached to left and right side portions of the vehicle body frame.

18. The inverted pendulum vehicle according to claim 15, wherein the left and right driving units are disposed in an offset relationship from each other in the upward and downward direction, and wherein an upper frame portion of the vehicle body frame, to which a lower one of the driving units is attached, is positioned below an upper one of the driving units, such that a space for receiving a tool for rotating the adjustment bolt for adjusting the position of the lower one of the driving units is maintained between the upper frame portion and a bottom portion of the upper one of the driving units.

19. The inverted pendulum vehicle according to claim 15, wherein each of the left and right driving units comprises an electric motor and a reduction gear, and wherein the reduction gear of each of the left and right driving units is fixed to a corresponding one of the attachment plates, and the electric motor of each of the left and right driving units is spaced away from the corresponding attachment plate.

\* \* \* \* \*